(12) United States Patent
Niida et al.

(10) Patent No.: US 7,123,621 B1
(45) Date of Patent: Oct. 17, 2006

(54) DATA COMMUNICATION SYSTEM, DATA COMMUNICATION METHOD AND DATA COMMUNICATION APPARATUS

(75) Inventors: Mitsuo Niida, Yokohama (JP); Takashi Kobayashi, Yokohama (JP); Shinichi Hatae, Kawasaki (JP); Shinji Ohnishi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/288,038

(22) Filed: Apr. 8, 1999

(30) Foreign Application Priority Data

Apr. 9, 1998 (JP) ............................... 10-097989
Apr. 5, 1999 (JP) ............................... 11-098163

(51) Int. Cl.
*H04L 12/28* (2006.01)
*H04L 12/56* (2006.01)
*G06F 15/173* (2006.01)

(52) U.S. Cl. .................. 370/402; 370/466; 370/395.5; 709/238

(58) Field of Classification Search ........ 370/465–467, 370/395.5, 423, 301, 360–365, 401, 402; 709/238
See application file for complete search history.

(56) References Cited

U.S. PATENT DOCUMENTS

| | | | | |
|---|---|---|---|---|
| 5,239,537 A | * | 8/1993 | Sakauchi | 370/218 |
| 5,384,831 A | * | 1/1995 | Creswell et al. | 379/114.05 |
| 5,440,613 A | * | 8/1995 | Fuentes | 379/60 |
| 5,541,930 A | | 7/1996 | Klingman | 370/110.1 |
| 5,586,117 A | * | 12/1996 | Edem et al. | 370/466 |
| 5,680,589 A | | 10/1997 | Klingman | 395/500 |
| 5,802,057 A | * | 9/1998 | Duckwall et al. | 370/408 |
| 5,938,735 A | * | 8/1999 | Malik | 709/238 |
| 5,999,525 A | * | 12/1999 | Krishnaswamy et al. | 370/352 |
| 6,006,286 A | * | 12/1999 | Baker et al. | 710/22 |
| 6,009,157 A | * | 12/1999 | Bales et al. | 379/209 |
| 6,058,115 A | * | 5/2000 | Sawyer et al. | 370/401 |
| 6,058,433 A | * | 5/2000 | Gilbert | 709/250 |
| 6,128,292 A | * | 10/2000 | Kim et al. | 370/356 |
| 6,134,628 A | * | 10/2000 | Hamadani | 711/103 |

(Continued)

FOREIGN PATENT DOCUMENTS

JP 6-98041 4/1994

OTHER PUBLICATIONS

IEC 61883-1, Consumer Audio/Video Equipment-Digital Interface-Part 1 General, First Edition, 1998-02, pp. 1-77.

*Primary Examiner*—Chi Pham
*Assistant Examiner*—Ronald Abelson
(74) *Attorney, Agent, or Firm*—Fitzpatrick, Cella, Harper & Scinto

(57) ABSTRACT

A communication system includes a source node including a first connection control register, a destination node including a second connection control register, and a controller. The controller is adapted to select one of a first and a second communication protocol as a communication protocol to be used between the source node and the destination node, to set a logical connection to be used between the source node and the destination node, to access the first connection control register to store therein information for the communication protocol selected by the controller and information for the logical connection set by the controller, and to access the second connection control register to store therein information for the communication protocol selected by the controller and information for the logical connection set by the controller. The first communication protocol uses an asynchronous transfer, but does not use an isochronous transfer.

16 Claims, 12 Drawing Sheets

U.S. PATENT DOCUMENTS

| | | | |
|---|---|---|---|
| H1917 H * | 11/2000 | Browing et al. | 370/465 |
| 6,233,017 B1 * | 5/2001 | Chaddha | 348/412 |
| 6,246,759 B1 * | 6/2001 | Greene et al. | 379/265 |
| 6,275,472 B1 * | 8/2001 | Yamaguchi et al. | 370/252 |
| 6,334,161 B1 * | 12/2001 | Suzuki et al. | 710/29 |
| 6,453,343 B1 * | 9/2002 | Housel et al. | 709/213 |
| 6,690,648 B1 | 2/2004 | Niida et al. | 370/236 |
| 2003/0179719 A1 | 9/2003 | Kobayashi et al. | 370/282 |

* cited by examiner

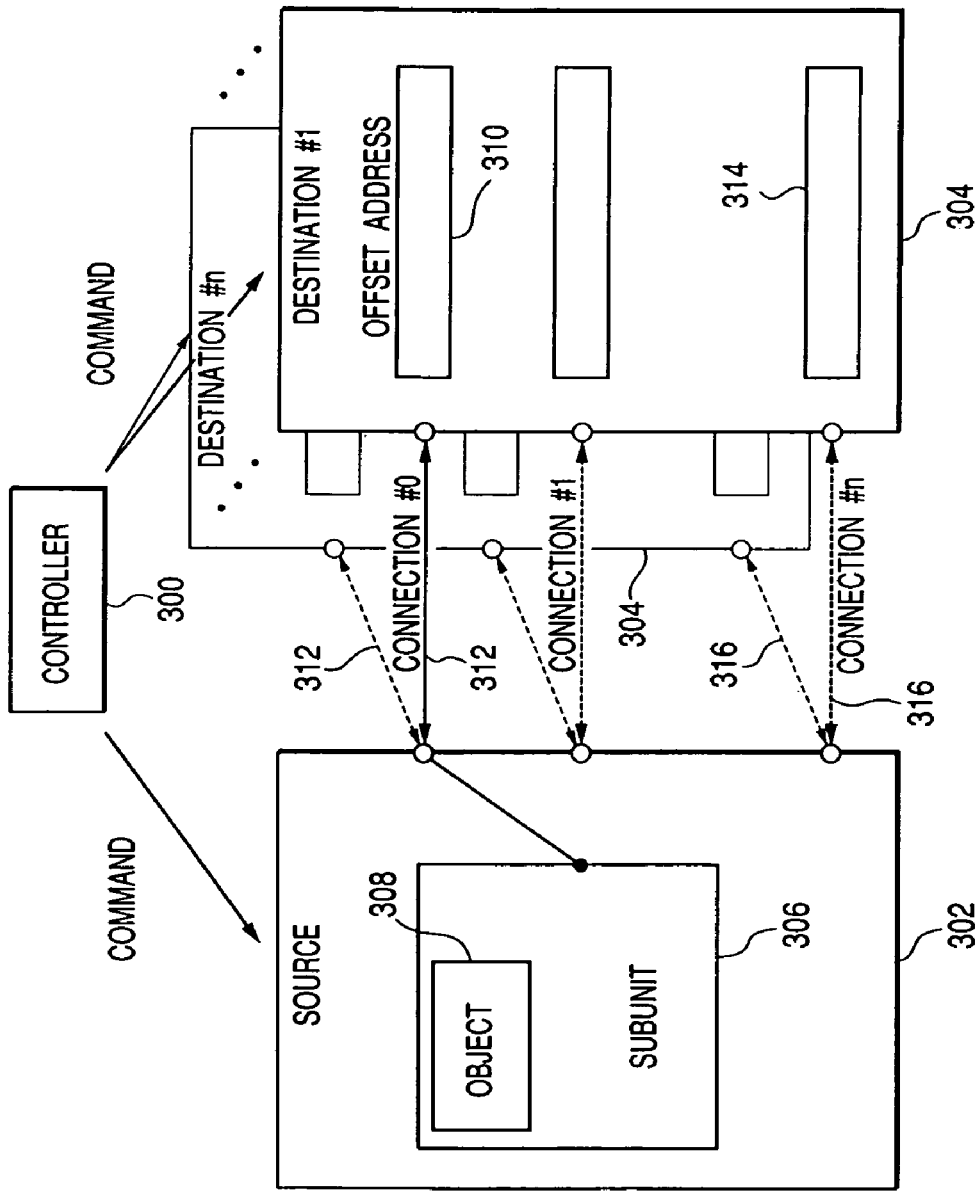

FIG. 4A
FIG. 4B
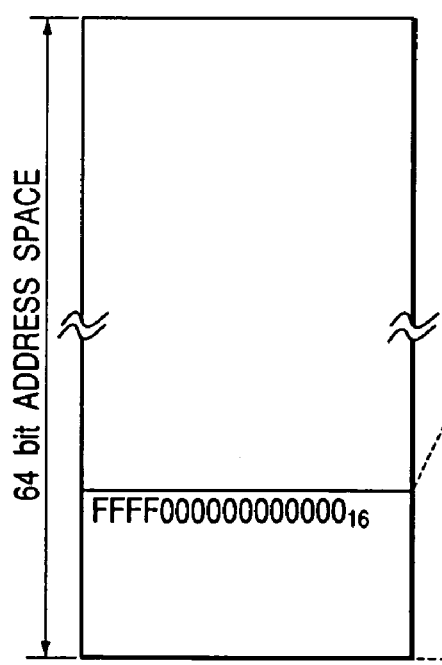
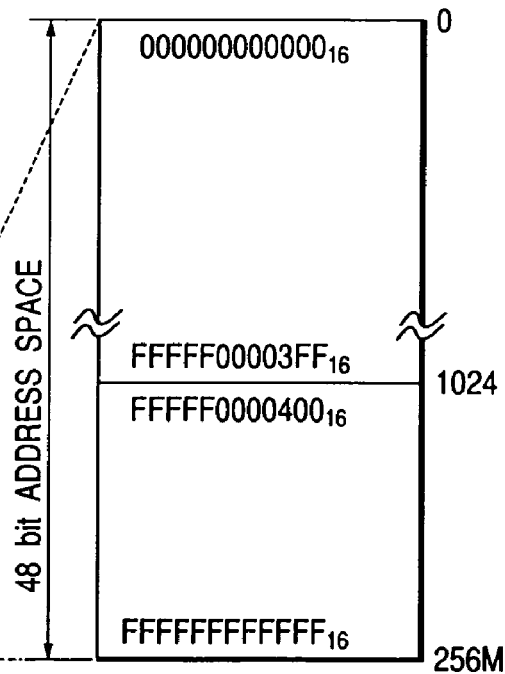

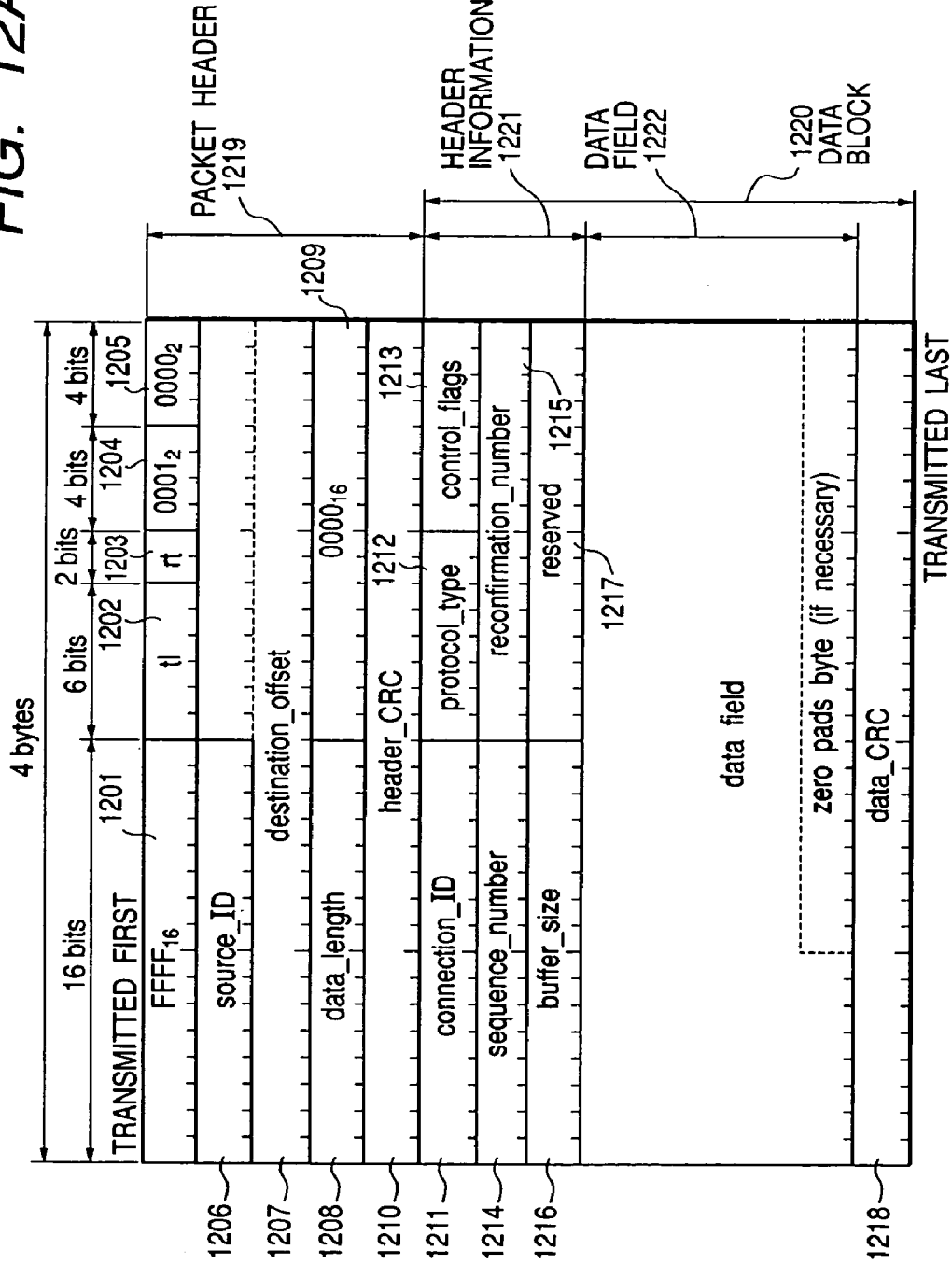

ASYNCHRONOUS STREAM PACKET FORMAT

DATA COMMUNICATION SYSTEM, DATA COMMUNICATION METHOD AND DATA COMMUNICATION APPARATUS

BACKGROUND OF THE INVENTION

1. Field of the Invention

The present invention relates to a data communication system, a data communication method and a data communication apparatus, and, more particularly, it relates to a network in which communication is effected at a high speed while mixing information data (including image data) and command data, and a communication protocol applicable to such a network.

2. Related Background Art

In the past, among peripheral equipments for a personal computer (referred to as "PC" hereinafter), hard discs and printers have been used most widely. Such a peripheral equipment has been connected to the PC via a multi-purpose digital interface such as an exclusive I/O interface or an SCSI (small computer system interface).

On the other hand, recently, AV (Audio/Visual) equipments such as digital cameras, digital video cameras or the like have also been noticed as one of the peripheral equipment for the PC. Such an AV (Audio/Visual) equipment has also been connected to the PC via an exclusive interface.

However, in the conventional communication system, the digital interface of the peripheral equipment and the digital interface of the AV equipment have no interchangeability, so that these digital interfaces could not interconnected directly. Thus, for example, when a still image is desired to be communicated, the data had to be passed through the PC without fail.

Further, in the conventional exclusive interface and/or SCSI interface, particularly when large capacity data such as a moving image or a still image of the AV equipment is processed, there arose various problems that a data transfer rate becomes low, that a fat communication cable is required for parallel communication, that the number and kind of peripheral equipments capable of being connected are limited, that a connection system is limited and that real time data transfer cannot be effected.

As one of next generation high speed and high performance digital interfaces for solving the above problems, IEEE (The Institute of Electrical and Electronics Engineers, Inc.) 1394-1995 Standard is already known.

The digital interface based upon the IEEE 1394-1995 Standard (referred to as "1394 interface" hereinafter) has the following features:

(1) A data transfer speed is fast.

(2) A real time data transfer system (i.e., isochronous transfer system) and an asynchronous transfer system can be supported.

(3) A connection construction (topology) having high degree of freedom can be fabricated.

(4) A plug-and-play function and a hot-line insertion/withdrawal function are supported.

However, in the IEEE 1394-1995 Standard, although physical and electrical constructions of connectors and two fundamental data transfer systems are defined, there was no definition regarding how to transmit and receive what kind of data through what kind of data format on the basis of what kind of communication protocol.

Further, in the isochronous transfer system based upon the IEEE 1394-1995 Standard, since response to outgoing packets is not stipulated, it is not ensured whether each isochronous packet is positively received. Accordingly, when it is desired that continuous plural data are positively transferred or when it is desired that one file data is positively transferred while dividing it into plural data, the isochronous transfer system could not be used.

Furthermore, in the isochronous transfer system based upon the IEEE 1394-1995 Standard, even when there is vacancy in transfer band, the total number of transmissions is limited to sixty-four. Thus, when it is desired that many transmissions are effected with smaller transfer bands, the isochronous transfer system could not be used.

In addition, in the IEEE 1394-1995 Standard, if bus reset is generated in response to ON/OFF of a power source for nodes or connection/disconnection of the node, data transfer must be interrupted. However, in the IEEE 1394-1995 Standard, if the data transfer is interrupted due to the bus reset or error in transmission, it could not be known what kind of data contents are lost. Further, in order to restore the interrupted transfer, very complicated transmission sequence was required. Incidentally, the bus reset refers to a function for automatically effecting recognition of new topology and the setting of address (node ID) assigned to each node. In the IEEE 1394-1995 Standard, this function can provide the plug-and-play function and the hot-line insertion/withdrawal function.

Further, in the communication system based upon the IEEE 1394-1995 Standard, communication protocol in which (although real time ability is not required) object data (for example, still image, graphic data, text data, file data, program data and the like) having relatively large data amount and requiring reliability are continuously transferred while dividing such data into one or more segment data was not proposed concretely.

Particularly, in the communication system based upon the IEEE 1394-1995 Standard, communication protocol in which data transmission between plural equipments is achieved by using a communication system for broadcasting data in an asynchronous transferring was not also proposed concretely.

Further, when a plurality of such protocols are proposed, it is desirable that a recipient protocol is automatically discriminated and is used properly. However, a method in which a plurality of different communication protocols are used properly was not also proposed concretely.

SUMMARY OF THE INVENTION

An object of the present invention is to solve the above-described problems.

Another object of the present invention is to provide a technique in which object data not requiring real time ability can be transferred positively in a data communication system, a data communication method and a data communication apparatus.

Also, another object of the present invention is to provide a technique capable of selecting a usable communication protocol even when plural different communication protocols exist in the data communication system, data communication method and data communication system.

As a preferred embodiment for such objects, the present invention discloses a communication system controlling a logical connection, and a method therefor. The system includes a controller, a source node including a first connection control register and a destination node including a second connection control register. The controller is adapted to select one of a first and a second communication protocol as a communication protocol to be used between the source node and the destination node, to set a logical connection to be used between the source node and the destination node, to access the first connection control register to store therein information for the communication protocol selected by the controller and information for the logical connection set by the controller, and to access the second connection control register to store therein information for the communication protocol selected by the controller and information for the logical connection set by the controller. The first communication protocol is a communication protocol that uses a broadcast communication, but does not use an isochronous transfer, and the controller, the source node and the destination node are adapted to communicate with each other using a communication unit conformed to IEEE 1394-1995 standard.

As another embodiment, the present invention discloses a controller, and a method therefor. The controller includes a controlling unit adapted to select one of a first and a second communication protocol as a communication protocol to be used between a source node including a first connection control register and a destination node including a second connection control register, to set a logical connection to be used between the source node and the destination node, to access the first connection control register to store therein information for the selected communication protocol and information for the set logical connection, and to access the second connection control register to store therein information for the selected communication protocol and information for the set logical connection. The first communication protocol is a communication protocol that uses a broadcast communication, but does not use an isochronous transfer, and the source node and the destination node are adapted to communicate with each other using a communication unit conformed to IEEE 1394-1995 standard.

As a further embodiment, the present invention discloses a communication system, and a method therefor. The system includes a source node including a first connection control register, a destination node including a second connection control register and a controller. The controller is adapted to select one of a first and a second communication protocol as a communication protocol to be used between the source node and the destination node, to set a logical connection to be used between the source node and the destination node, to access the first connection control register to store therein information for the communication protocol selected by the controller and information for the logical connection set by the controller, and to access the second connection control register to store therein information for the communication protocol selected by the controller and information for the logical connection set by the controller. The controller, the source node and the destination node are adapted to communicate with each other using a communication unit conformed to IEEE 1394-1995 standard, and the first communication protocol is a communication protocol that uses an asynchronous transfer, but does not use an isochronous transfer.

As a still further embodiment, the present invention discloses a controller, and a method therefor. The controller includes a controlling unit adapted to select one of a first and a second communication protocol as a communication protocol to be used between a source node including a first connection control register and a destination node including a second connection control register, to set a logical connection to be used between the source node and the destination node, to access the first connection control register to store therein information for the selected communication protocol and information for the set logical connection, and to access the second connection control register to store therein information for the selected communication protocol and information for the set logical connection. The source node and the destination node are adapted to communicate with each other using a communication unit conformed to IEEE 1394-1995 standard, and the first communication protocol is a communication protocol that uses an asynchronous transfer, but does not use an isochronous transfer.

Still other objects of the present invention, and the advantages thereof, will become fully apparent from the following detailed description of the embodiments.

BRIEF DESCRIPTION OF THE DRAWINGS

FIG. 3 is a conceptional view for explaining a fundamental construction of first and second communication protocols according to a preferred embodiment of the present invention;

FIGS. 4A and 4B are views for explaining an address space of each node;

FIGS. 12A and 12B are views for showing a data packet used in the first communication protocol.

DETAILED DESCRIPTION OF THE PREFERRED EMBODIMENTS

The preferred embodiments of the present invention will now be described in detail hereinafter with reference to the accompanying drawings.

Figure 1:
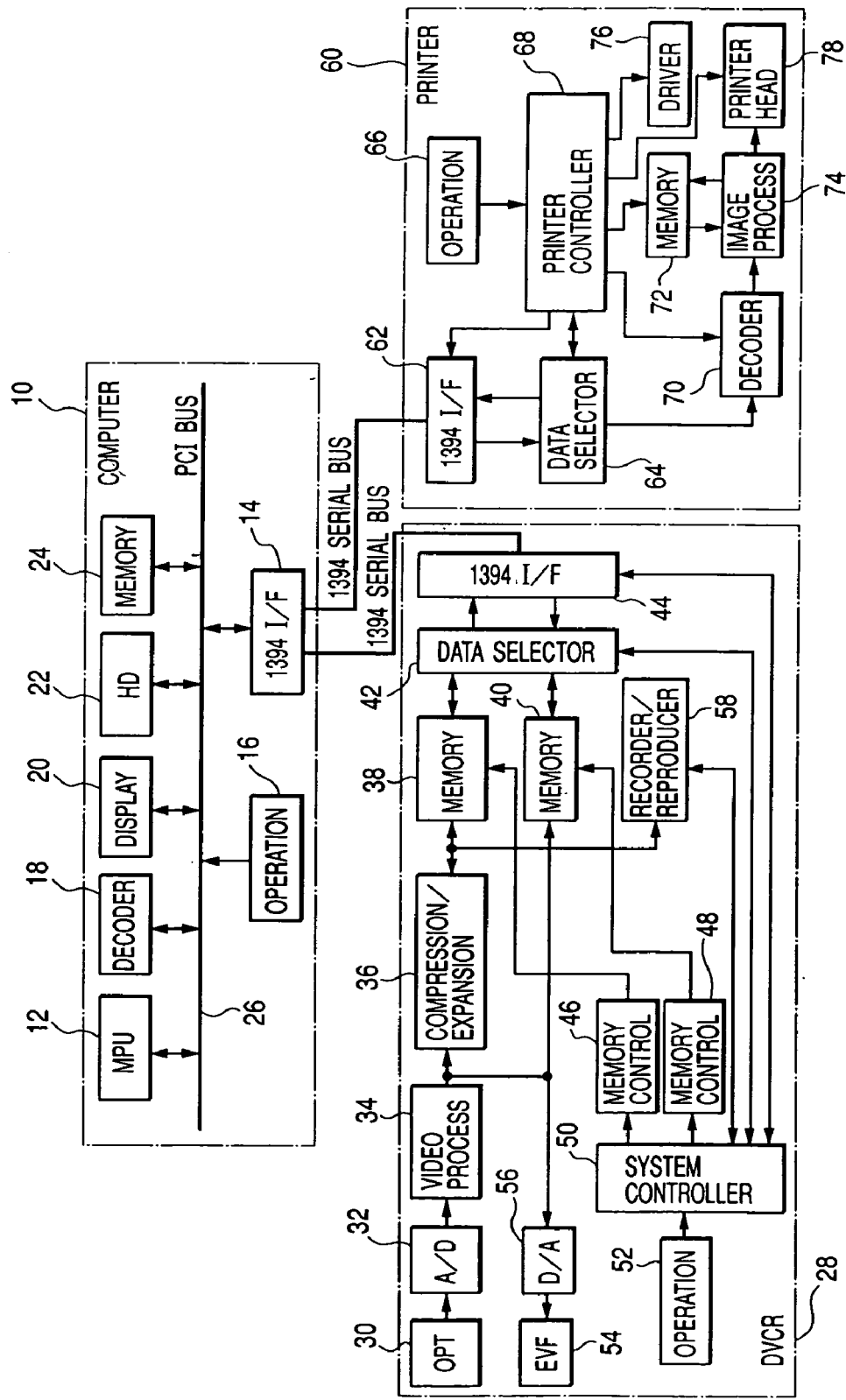
FIG. 1 is a block diagram showing a communication system according to a preferred embodiment of the present invention.

FIG. 1 is a view showing an example of a construction of a data communication system according to an embodiment of the present invention. As shown in FIG. 1, the data communication system according to this embodiment is constituted by a computer 10, a camera integrating digital video recorder 28, and a printer 60.

First of all, a construction of the computer 10 will be described. The computer 10 includes a calculation processing unit (MPU) 12 for controlling an operation of the computer 10, a 1394 interface 14 having a function based upon the IEEE 1394-1995 Standard and a function regarding a communication protocol stipulated in this embodiment, an operation unit 16 comprised of a keyboard and a mouse, a detector 18 decoding compressed and coded digital data (moving image data, still image data, voice data and the like), a display unit (display) 20 comprised of a display device such as a CRT display or a liquid crystal panel, a hard disc 22 for storing various digital data (moving image data, still image data, voice data, graphic data, text data, program data and the like), an internal memory 24, and an internal bus 26 for interconnecting various processing units within the computer 10.

Next, a construction of the camera integrating digital video recorder (referred to as "DVCR" hereinafter) 28 will be described. The DVCR includes an imaging unit (opt) 30 for converting an optical image of an object into an electric signal and for supplying the electric signal to an analogue/digital (A/D) converter 32, an image processing unit 34 for converting digitalized moving image and still image into digital image data having predetermined format, a compression/expansion processing unit 36 having a function for decoding the compressed and coded digital data (moving image data, still image data, voice data and the like) and a function for coding the digital image data with high efficiency (for example, as is in an MPEG system and a DV system, for quantigating and coding the data with variable length after orthogonally converting the data into predetermined image units), a memory 38 for temporarily storing the digital image data coded with high efficiency, a memory 40 for temporarily storing the digital image data not coded with high efficiency, a data selector 42, a 1394 interface 44 having a function based upon the IEEE 1394-1995 Standard and a function regarding a communication protocol stipulated in this embodiment, a memory control units 46, 48 for controlling writing and reading of the memories 38, 40, a control unit (system controller) 50 adapted to control an operation of the DVCR 28 and having a microcomputer, an operation unit 52 comprised of a remote controller and an operation panel, an electronic view finder (EVF) 54, a D/A converter 56, and a recorder/reproducer unit 58 comprised of a recording medium such as a magnetic tape, a magnetic disc, a photo-magnetic disc or the like and adapted to record and reproduce various data (moving image data, still image data, voice data and the like).

Next, a construction of the printer 60 will be described. The printer includes a 1394 interface 62 having a function based upon the IEEE 1394-1995 Standard and a function regarding a communication protocol stipulated in this embodiment, a data selector 64, an operation unit 66 comprised of an operation button and a touch panel, a printer controller 68 for controlling an operation of the printer 60, a decoder 70, an internal memory 72, an image processing unit 74 for processing the still image data, text data, graphic data and the like received through the 1394 interface, a driver 76, and a printer head 78.

As shown in FIG. 1, various communication apparatuses (referred to as "nodes" hereinafter) such as the computer 10, DVCR 28 and printer 60 are connected to each other via the 1394 interfaces 14, 44, 62 (hereinafter, a network constituted by the 1394 interface is referred to as "1394 serial bus"). In the respective nodes, by defining predetermined communication protocols, sending and receiving of various object data (for example, moving image data, still image data, voice data, graphic data, text data, program data and the like) and remote control based on command data can be performed.

Next, operations of respective nodes constituting the communication system according to the illustrated embodiment will be explained with reference to FIG. 1.

First of all, functions and operations of various processing units constituting the computer 10 will be described.

In the illustrated embodiment, for example, the computer 10 acts as a computer for controlling transmission and reception of image data between the DVCR 28 and the printer 60 or a computer for remotely controlling the DVCR 28 and the printer 60.

The MPU 12 serves to execute software recorded in the hard disc 22 and to shift various data to the internal memory 24. Further, the MPU 12 also serves to adjust the various processing units connected to the MPU via the internal bus 26.

The 1394 interface 14 serves to receive the image data transferred onto the 1394 serial bus and to send the image data stored in the hard disc 22 or the internal memory 24 to the 1394 serial bus. Further, the 1394 interface 14 serves to transmit the command data for remotely controlling other nodes on the 1394 serial bus. In addition, the 1394 interface 14 has a function for transferring a signal transferred through the 1394 serial bus to other node.

The user or operator can select desired software via the operation unit 16 and cause the MPU 12 to execute the software stored in the hard disc 22. Information regarding the software is displayed to the user through the display unit 20. The decoder 18 serves to decode the image data received from the 1394 serial bus, on the basis of the software. The decoded image data is represented to the user through the display unit 20.

Next, functions and operations of various processing units constituting the DVCR 28 will be described.

In the illustrated embodiment, for example, the DVCR 28 acts as an image transmitting device (source node) for transferring the image data in an asynchronous transferring on the basis of the communication protocol according to the illustrated embodiment.

The imaging (image pickup) unit 30 serves to convert the optical image of the object into the electric signal comprised of a luminance signal (Y) and a color difference signal (C) and to supply the electric signal to the A/D converter 32. The A/D converter 32 serves to digitalize the electric signal.

The image processing unit 34 serves to effect predetermined image processing with respect to the digitalized luminance signal and color difference signal and to multiply the signals. The compression/expansion processing unit 36 may process the luminance signal and the color difference signal in parallel by using independent compression processing circuits. Further, they may be processed in a time-share manner by using a common compression processing circuit.

Further, in the compression/expansion processing unit 36, in order to increase resistance to transmission path error, the compressed image data is subjected to shuffling process. As a result, continuous code error (i.e., burst error) can be converted into scattered error (i.e., random error) which can easily be corrected or interpolated. When it is desired to make offset of information amount due to roughness/density in the image uniform, before the compressing process, this process is effected. It is advantageous particularly when the coding with variable length such as run length is used.

In the compression/expansion processing unit 36, data discriminating information (ID) for restoring the shuffling is added to the compressed image data. Further, the compression/expansion processing unit 36 adds an error correction code (ECC) to the compressed image data in order to reduce error on recording/reproducing.

The image data compressed in the compression/expansion processing unit 36 is supplied to the memory 38 and the recorder/reproducer unit 58. The recorder/reproducer unit 58 serves to record the added compressed image data such as ID or ECC on a recording medium such as a magnetic tape. The compressed image data is recorded on an independent recording area different from the voice data.

On the other hand, the image data supplied from the image processing unit 34 to the D/A converter 56 is D/A-converted. The EVF 54 serves to display an analogue image signal supplied from the D/A converter 56. Further, the image data processed in the image processing unit 34 is also supplied to the memory 40. Non-compressed image data is stored in the memory 40.

The data selector 42 selects the memory 38 or the memory 40 on the basis of the user's command and supplies the compressed image data or the non-compressed image data to the 1394 interface 44. Further, the data selector 42 supplies the image data supplied from the 1394 interface 44 to the memory 38 or the memory 40.

The 1394 interface 44 serves to transfer the compressed image data or the non-compressed image data in asynchronous transferring on the basis of a communication protocol according to the illustrated embodiment which will be described later. Further, the 1394 interface 44 serves to receive control command for controlling the DVCR 28 through the 1394 serial bus. The received control command is supplied to the control unit 50 through the data selector 42. The 1394 interface 44 sends back response to the control command.

Next, functions and operations of various processing units constituting the printer 60 will be described.

In the illustrated embodiment, for example, the printer 60 acts as an image receiving device (destination node) for receiving the image data transferred in the asynchronous transferring and for printing the image data, on the basis of the communication protocol according to the illustrated embodiment.

The 1394 interface 62 serves to receive the image data transferred in the asynchronous transferring and the control command through the 1394 serial bus. The 1394 interface 62 also serves to transmit response to the control command.

The received image data is supplied to the decoder 70 through the data selector 64. The decoder 70 serves to decode the image data and output a result to the image processing unit 74. The image processing unit 74 causes the memory 72 to temporarily store the decoded image data.

Further, the image processing unit 74 serves to convert the image data temporarily stored in the memory 72 into printing data and supply the print data to the printer head 78. The printer head 78 executes the printing under the control of the printer controller 68.

On the other hand, the received control command is inputted to the printer controller 68 through the data selector 64. The printer controller 68 performs various controls regarding the printing on the basis of the control data. For example, the printer controller controls sheet feed through the driver 76 and positioning of the printer head 78.

Next, constructions of the 1394 interfaces 14, 44, 62 according to the illustrated embodiment will be fully explained with reference to FIG. 2.

The 1394 interface is functionally constituted by a plurality of layers. In FIG. 2, the 1394 interface is connected to the 1394 interface of other node via a communication cable 201 based upon the IEEE 1394-1995 Standard. Further, the 1394 interface has one or more communication ports 202, and each communication port is connected to a physical layer 203 included in a hardware portion.

Figure 2:
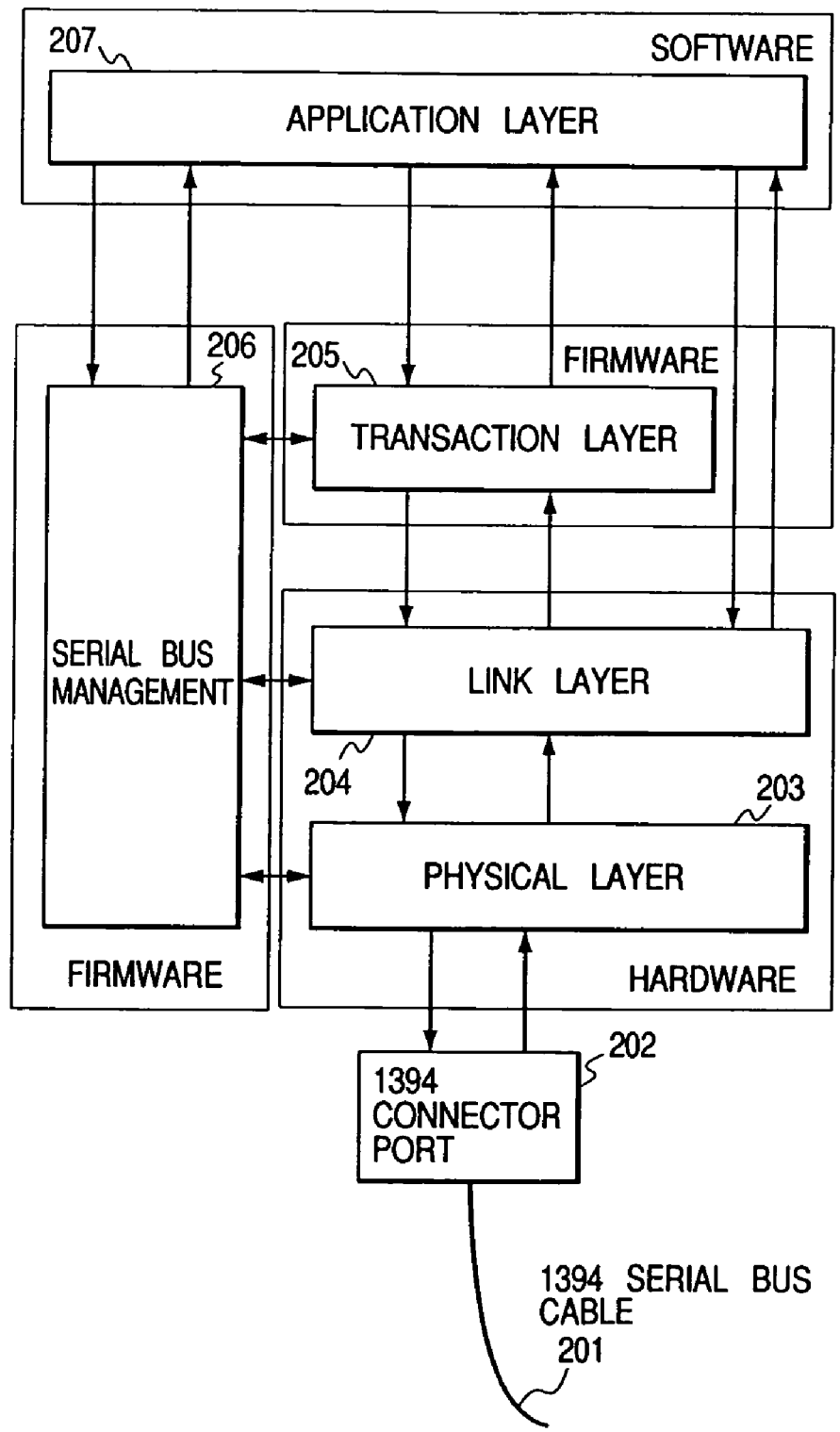
FIG. 2 is a view for explaining a 1394 interface according to a preferred embodiment of the present invention.

In FIG. 2, the hardware portion includes the physical layer 203 and a link layer 204. The physical layer 203 acts as a physical and electrical interface for other node and serves to effect detection of bus reset and processing therefor, coding/decoding of input and output signals and adjustment of bus usage right. The link layer 204 serves to effect formation of the communication packets, transmission and reception of various communication packets and control of a cycle timer. Further, the link layer 204 provides a function for performing formation and transmission/reception of a data packet used in a second communication protocol which will be described later.

In FIG. 2, a firmware portion includes a transaction layer 205 and a serial bus management 206. The transaction layer 205 controls an asynchronous transfer system and provides various transactions (read, write and lock). Further, the transaction layer 205 provides functions of the first and second communication protocols which will be described later. The serial bus management 206 provides functions for effecting control of its node, management of connection condition of its node, management of ID information of its node, resources management of the serial bus network, on the basis of an IEEE 1212 CSR Standard which will be described later.

The hardware portion and firmware portion shown in FIG. 2 substantially constitute the 1394 interface, and fundamental constructions thereof are stipulated in the IEEE 1394-1995 Standard.

An application layer 207 included in the software portion differs from each other depending upon application software used and controls how to transfer what kind of object data by using the first and second communication protocols.

The first and second communication protocols (described later) serves to expand the functions of the hardware portion and the firmware portion which constitute the 1394 interface and to provide a new transfer sequence to the software portion.

Next, fundamental constructions of the first and second communication protocols according to the illustrated embodiment will be described with reference to FIG. 3.

In FIG. 3, the reference numeral 300 denotes a controller; 302 denotes a source node; 304 denotes n (n≧1) (number) destination nodes; 306 denotes a subunit of the source node; and 308 denotes object data such as moving image data, still image data, graphic data, text data, file data, program data or the like.

The reference numeral 310 denotes a first memory space within the destination node 304 and is designated by predetermined destination offset (#0); and 312 denotes first connection showing a logical relationship (i.e., connection) between the source node 302 and the destination node 304. The destination offset means address for commonly designating the memory spaces of N (number) destination nodes 304.

The reference numeral 314 denotes n-th memory space within the destination node 304 and is designated by predetermined destination offset (#n); and 316 denotes n-th connection showing a logical connection relationship (i.e., connection) between the source node 302 and the destination node 304.

In the illustrated embodiment, each node controls or governs the first memory space 310 to n-th memory space 314 on the basis of 64-bit address space based upon the IEEE 1212 CSR (Control and Status Register Architecture) Standard (or ISO/IEC 13213:1994 Standard). The IEEE 1212 CSR Standard is Standard for stipulating control, management and address assignment of the serial bus.

FIGS. 4A and 4B are views for explaining the address space of each node. FIG. 4A shows address space of 64-bit for addressing the address space of each node. Upper 16 bits of the 64-bit address is used to designate a certain node in certain bus. FIG. 4B shows a portion of the address space shown in FIG. 4A, and, for example, used to designate a certain address space of the node designated by the upper 16 bits. The first memory space 310 to n-th memory space 314 shown in FIG. 3 are designated by 48-bit address shown in FIG. 4B (referred to as "destination offset"hereinafter). In FIG. 4B, for example, $000000000000_{16}$ to $0000000003FF_{16}$ are reserves areas, and, areas where the object data 308 is actually written are areas where the lower 48 bits of the address become $FFFFF0000400_{16}$ and so on.

In FIG. 3, the source node 302 means a node having a function for transferring the object data 308 in accordance with the first or second communication protocol, and the destination node 304 means a node for having a function for receiving the object data 308 transferred from the source node 302. Further, the controller 300 means a node having a function for setting and managing connection (i.e., logical connection relationship) between the source node 302 and the one or mode destination nodes 304 and having a function for selecting the communication protocol used in such connection.

The controller 300, source node 302 and destination node 304 may be operated in independent nodes. Alternatively, the controller 300 and the source node 302 may be operated in a single same node. Further, the controller 300 and the destination node 304 may be operated in a single same node. In this case, the transaction between the controller 300 and the source node 302 or the destination node 304 can be omitted, thereby simplifying the communication sequence.

In the illustrated embodiment, a case where the controller 300, source node 302 and destination node 304 are operated in independent nodes will be explained. For example, the computer 10 having the 1394 interface 14 acts as the computer 300. Further, the DVCR 28 having the 1394 interface 14 acts as the source node 302 and the printer 60 having the 1394 interface 14 acts as the destination node 304.

In the illustrated embodiment, as shown in FIG. 3, one or more connections can be set between the source node 302 and one or more destination node 304. When it is required that certain object data be transferred, each connection is set by the controller 300 on the basis of the output register (FIGS. 5A and 5B) of the source node 302 and input register (FIGS. 6A and 6B) of the destination node 304 which will be described later.

Incidentally, in the illustrated embodiment, the computer 10 as the controller 300 may be operated as the destination node 304. In this case, the connections are set between one source node 302 and two destination nodes 304 to transfer the object data 308.

Further, in the illustrated embodiment, while an example that the computer 10 is operated as the controller 300 was explained, it is not necessary that the computer 10 acts as the controller 300. The DVCR 28 or the printer 60 may be operated as the controller 300.

Figure 5A:
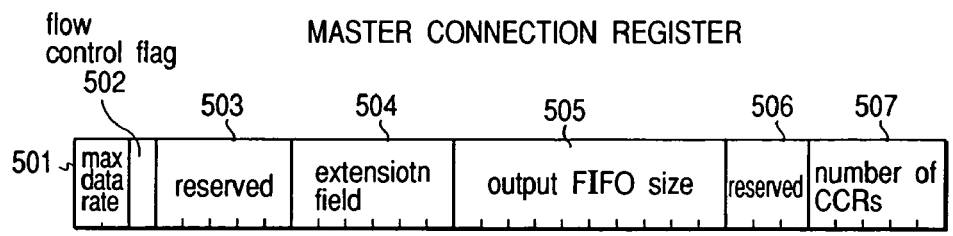
FIGS. 5A and 5B are views for explaining an output registers (oMCR and oCCR) of a source node according to a preferred embodiment of the present invention.
Figure 5B:
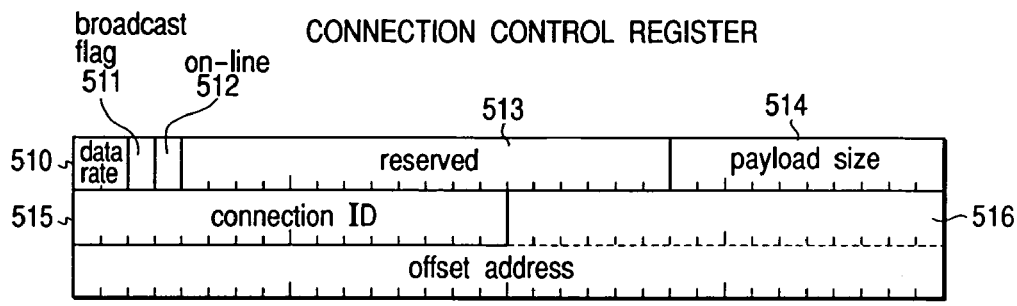
Figure 6A:
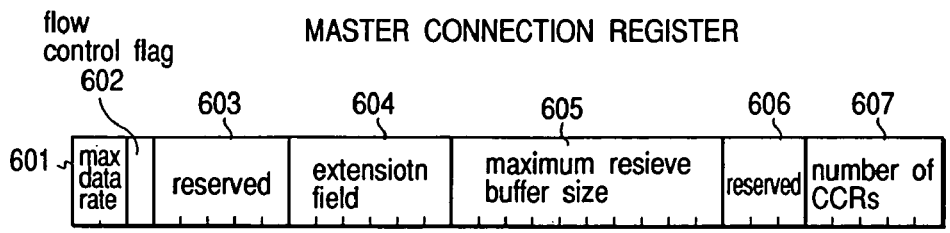
FIGS. 6A and 6B are views for explaining an input registers (iMCR and iCCR) of a destination node according to a preferred embodiment of the present invention.
Figure 6B:
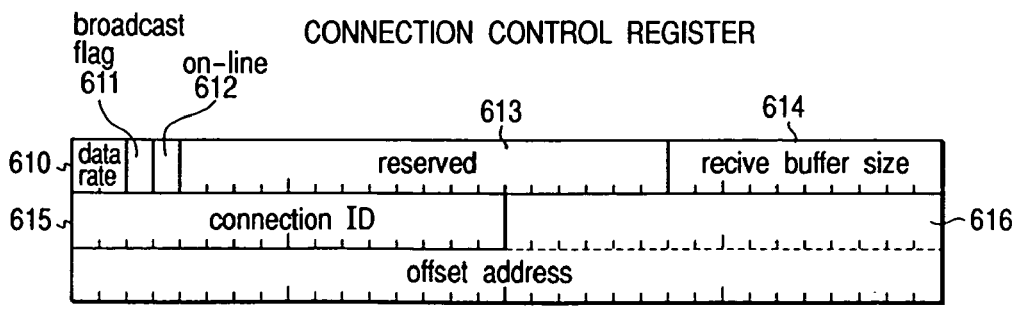

Next, the register space of the source node 302 and the register space of the destination node 304 according to the illustrated embodiment will be explained with reference to FIGS. 5A, 5B, 6A and 6B. FIGS. 5A and 5B are views each explaining a construction of the output register of the source node 302. FIGS. 6A and 6B are views each explaining a construction of the input register of the destination node 304.

Each register space is prepared in a predetermined area on the address space shown in FIGS. 4A and 4B, and, when the controller 300 sets the connection between the source node 302 and the destination node 304, it is selected which first or second communication protocol is assigned to the connection.

FIG. 5A shows an output master connection register (referred to as "oMCR" hereinafter). The oMCR is mainly a register space (or memory space) describing communication ability of the source node 302.

Uppermost field 501 (2 bits) of the oMCR is a max data rate field indicating a maximum output bit rate of the source node 302. An example of values set in the max data rate field is shown in the following Table 1.

A next field 502 (1 bit) is a flow control flag indicating whether a first communication protocol (i.e., protocol using broadcast sending) according to the illustrated embodiment) can be used or not. For example, when the value of this field is "1", it indicates that the first communication protocol can be used. If the value is "0", it indicates that the second communication protocol can be used. A next field 503 (5 bits) is a reserved field which is prepared in the future.

TABLE 1

| max data rate | Maximum bit rate |
|---|---|
| $00_2$ | 100 Mbps |
| $01_2$ | 200 Mbps |
| $10_2$ | 400 Mbps |
| $11_2$ | reserved |

A next field 504 (6 bits) is an extension field which is used when an output FIFO size field (described later) is expanded in the future. A next field 505 (10 bits) is an output FIFO size field indicating a memory capacity of a pre-incoming/pre-outgoing buffer memory (referred to as "FIFO memory" hereinafter) used for outputting data.

A next field 506 (3 bits) is a reserved field which is prepared in the future. A lowermost field 507 (5 bits) is a number of CCRs field indicating the number of output connection control registers (FIG. 5B) (described later), i.e., the number of connections which can be set in the source node 302.

FIG. 5B shows an output connection control register (referred to as "oCCR" hereinafter). The oCCR is a register space (or memory space) describing as to one of connections set in the source node 302. The source node 302 may have a single oCCR or plural oCCRs.

In the oCCR, an uppermost field 510 (2 bits) is a data rate field indicating output bit rate used in the connection set in the oCCR. An example of values set in the data rate field is shown in "Table 2".

TABLE 2

| data rate | bit rate |
|---|---|
| $00_2$ | 100 Mbps |
| $01_2$ | 200 Mbps |
| $10_2$ | 400 Mbps |
| $11_2$ | reserved |

A next field 511 (1 bit) is a broadcast flag field indicating which communication protocol is used in the connection set in the oCCR. When a value of the broadcast flag field is "1", it indicates that the first communication protocol is used, for example.

A next field 512 (1 bit) is an on-line field indicating whether the oCCR is used or not. When a value of the on-line field is "1", it indicates that the oCCR is used.

A next field 513 (18 bits) is a reserved field which is prepared in the future. A next field 514 (10 bits) is a payload size field indicating a data amount of a data packet transferred by one data transferring. The data amount shows a payload size of the data packet and does not include additional data such as packet header.

A next field 515 (16 bits) is a connection ID field in which discrimination information (i.e., connection ID) for discriminating the connection set in the oCCR. A last field 516 (48 bits) is an offset address field indicating a top address of the predetermined memory space reserved in the destination node 304.

FIG. 6A shows an input master connection register (referred to as "iMCR" hereinafter). The iMCR mainly is a register space (or memory space) describing communication ability of the destination node 304.

An uppermost field 601 (2 bits) of the iMCR is a max data rate field indicating a maximum bit rate of the destination node 304. Values set in the max data rate may be the values shown in the above Table 1, for example.

A next field 602 (1 bit) is a flow control flag field indicating whether the first communication protocol (i.e., protocol using broadcast sending according to the illustrated embodiment) can be used or not. For example, when the value of this field is "1", it indicates that the first communication protocol can be used. If the value is "0", it indicates that the second communication protocol can be used. A next field 603 (5 bits) is a reserved field which is prepared in the future.

A next field 604 (6 bits) is an extension field which is used when a maximum receive buffer size field (described later) is expanded in the future. A next field 605 (10 bits) is a maximum receive buffer size field indicating a maximum capacity of a receiving buffer used for inputting data. The maximum receive buffer size field indicates a maximum data amount of one segment.

A next field 606 (3 bits) is a reserved field which is prepared in the future. A lowermost field 607 (5 bits) is a number of CCRs field indicating the number of input connection control registers (FIG. 6B) (described later), i.e., the number of connections which can be set in the destination node 304.

FIG. 6B shows an input connection control register (referred to as "iCCR" hereinafter). The iCCR is a register space (or memory space) describing one of connections set in the destination node 304. The destination node 304 may have only one iCCR or may have a plurality of iCCRs.

In the iCCR, an uppermost field 610 (2 bits) is a data rate field indicating input bit rate used in the connection set in the iCCR. Values set in the data rate field may be the values in the above Table 2, for example.

A next field 611 (1 bit) is a broadcast flag field indicating which communication protocol is used in the connection set in the iCCR. When a value of the broadcast flag field is "1", it indicates that the first communication protocol is used, for example.

A next field 612 (1 bit) is an on-line field indicating whether the iCCR is used or not. When a value of the on-line field is "1", it indicates that the iCCR is used. A next field 613 (18 bits) is a reserved field which is prepared in the future.

A next field 614 (10 bits) is a receive buffer size field indicating a size of the memory space reserved in the destination node 304, i.e., a data amount of one segment.

A next field 615 (16 bits) is a connection ID field in which discrimination information (i.e., connection ID) for discriminating the connection set in the iCCR.

A last field 616 (48 bits) is an offset address field indicating a top address of the predetermined memory space reserved in the destination node 304.

Next, command for reading out the contents of the registers shown in FIGS. 5A, 5B, 6A and 6B and command for writing predetermined values in the registers will be explained.

Figure 7:
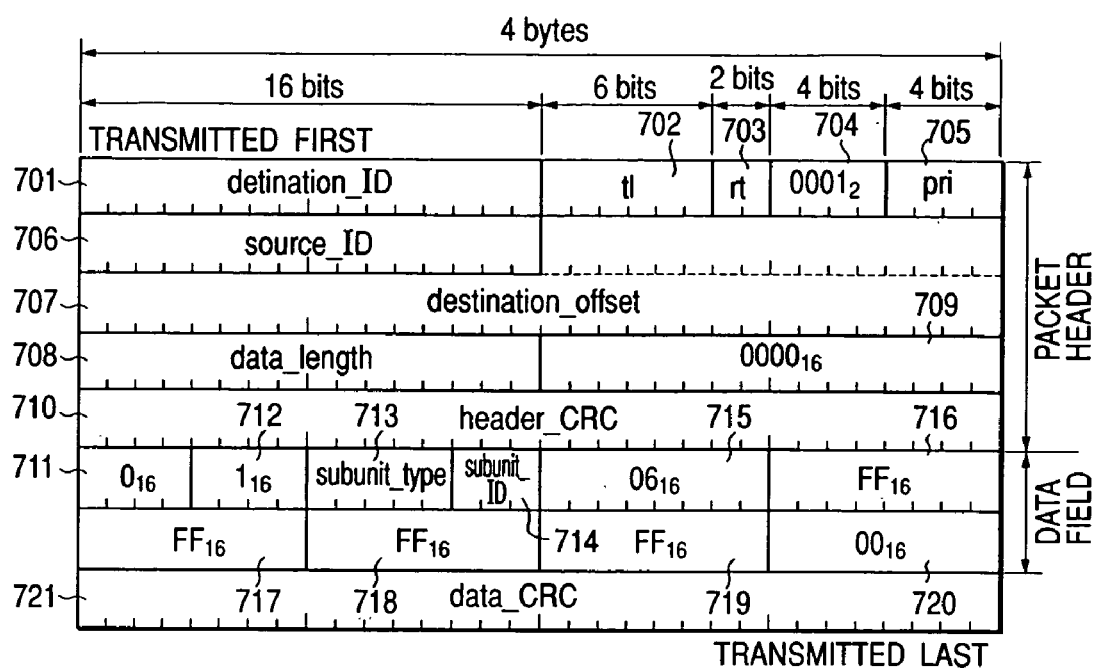
FIG. 7 is a view showing command for reading out contents of the oMCR of FIG. 2 and iMCR of FIG. 3.

Each command is packetized in an asynchronous packet based upon the IEEE 1394-1995 Standard and is transferred to the designated node. As shown in FIG. 7, the asynchronous packet is a data packet having unit of 1 Quadlet (4 bytes=32 bits).

The controller 300 according to the illustrated embodiment can read out the value in the oMCR shown in FIG. 5A and iMCR shown in FIG. 6A by using READ MCR status command shown in FIG. 7.

In FIG. 7, a field 701 (16 bits) is a destination ID field for designating node ID of the recipient. A field 702 (6 bits) is a transaction level (tl) field for designating tag inherent to each transaction.

A field 703 (2 bits) is a retry (rt) code for designating whether the packet effects retry or not. A field 704 (4 bits) is a transaction code (tcode). The tcode designates format of the packet and a type of transaction which must be executed. In the illustrated embodiment, a value of this field is selected to "$0001_2$" for example, and requests for a process (i.e., write transaction) for writing the data field of this packet in the memory space of the destination offset field 707. Further, when the value is selected to "$0005_2$", a reading process (i.e., read transaction) is requested.

A field 705 (4 bits) shows priority (pri) and designates a preferential order. In the illustrated embodiment, a value of this field is selected to "$0000_2$". A field 706 (16 bits) is a source ID field for designating node ID of the recipient.

A field 707 (48 bits) is a destination offset field for designating the address space of the node designated by the destination ID field 701. A field 708 (16 bits) is a data length field for indicating a length a data field (described later) as a unit of byte.

A field 709 (16 bits) is an extended tcode field. In the illustrated embodiment, a value of this field is selected to "$0000_2$" A field 710 (32 bits) a header CRC field in which error detecting codes for detecting errors in the fields 701 to 709.

Next, a construction of data fields will be explained. In the illustrated embodiment, if a data amount stored in the data field does not reach the multiple of "Quadlet", "0" is added until the multiple of "Quadlet" is obtained.

A field 711 (4 bits) is a common/transaction set (CTS) field. In the illustrated embodiment, since the CTS defined by AV/C Digital Interface Command Set General Specification Standard (referred to as "AV/C Command Standard" hereinafter) is used a value "$0_{16}$" is set in this field.

A field 712 (4 bits) is a ctype/response field for designating various commands and responses to such command. For example, when status command is designated, a value "$1_{16}$" is set in this field. When response corresponding to this status command (i.e., status response) is designated, a value "$C_{16}$" is set in this field.

A field 713 (5 bits) is a subunit type field for designating an imaginary function unit (i.e., subunit) of a certain node. The "subunit" is defined in the AV/C Command Standard and, for example, includes VTR subunit, printer subunit or the like.

A field 714 (3 bits) is a subunit ID field. If the function units designated by the subunit type field 713 are more than 1 (one), this field designates ID numbers for discriminating such function units.

A field 715 (8 bits) is an opcode field for designating the kind of command. When the READ MCR command according to the illustrated embodiment is designated, for example, a value "$06_{16}$" is set in this field.

Fields 716 (8 bits) to 719 (8 bits) are operand[0] to operand[3] fields, contents of which are differentiated in dependence upon the contents of the ctype/response field 712 and the opcode field 715. For example, in case of the READ MCR status command, a value "$FF_{16}$" is set in each field. On the other hand, in case of the READ MCR status response, a value of the oMCR of FIG. 5A or a value of the iMCR of FIG. 6B is set.

A value "0" is set in a field 720 (8 bits). A field 721 (32 bits) is a data CRC field in which error detecting codes for detecting errors in the fields 711 to 720 are stored, as is in the header CRC field.

Figure 8:
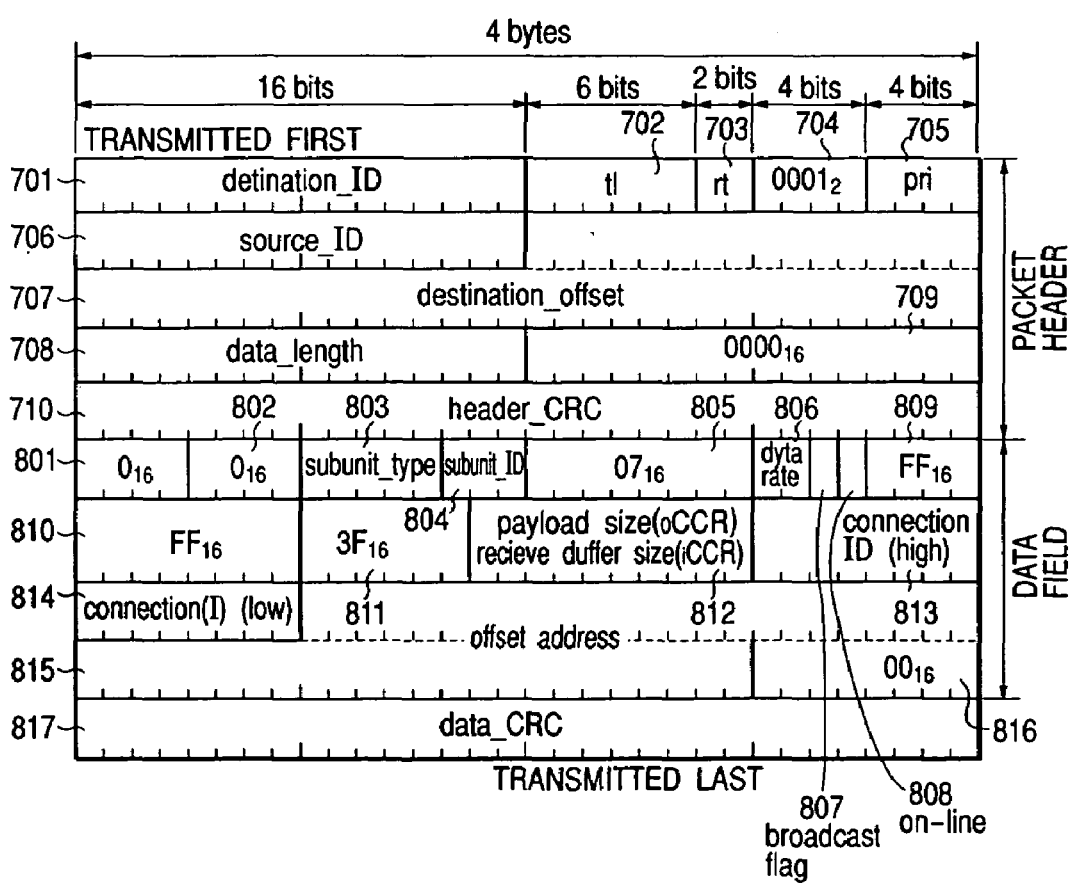
FIG. 8 is a view showing command for writing a predetermined value in the oCCR of FIG. 2 and iCCR of FIG. 3.

The controller 300 according to the illustrated embodiment can write a predetermined value in the oCCR of FIG. 5B or the iCCR of FIG. 6B by using SET CCR control command shown in FIG. 8.

In FIG. 8, fields 701 to 710 included in a packet header are constituted similar to FIG. 7. Accordingly, hereinafter, constructions of data fields of SET CCR control command will be described.

A field 801 (4 bits) is a CTS field in which a value "$0_{16}$" is set, as is in the READ MCR status command.

A field 802 (4 bits) is a ctype/response field for designating various commands and responses to such command. For example, when control command is designated, a value "$0_{16}$" is set in this field. When response indicating receipt of this control command is returned, a value "$9_{16}$" indicating ACCEPTED response is set in this field. On the other hand, when response indicating the fact that the control command is not received is returned, a value "$A_{16}$" indicating REJECTED response is set in this field.

A field 803 (5 bits) is a subunit type field for designating a predetermined subunit, as is in the READ MCR status command of FIG. 7. A field 804 (3 bits) is a subunit ID field for designating an ID number for discriminating a predetermined subunit.

A field 805 (8 bits) is an opcode field for designating the kind of command. When the SET CCR command according to the illustrated embodiment is designated, for example, a value "$07_{16}$" is set in this field.

A field 806 (2 bits) is a data rate field for indicating input bit rate used by the connection set in the desired oCCR (or iCCR). Values set in the data rate field are the same as the values shown in the above Table 2, for example.

A field 807 (1 bit) is a broadcast flag field including a flag for indicating which communication protocol is used by the connection set in the desired oCCR (or iCCR). When the broadcast flag field is "1", for example, the first communication protocol is set.

A field 808 (1 bit) is an on-line field. A value "1" is set in this field to request the use of the desired oCCR (or iCCR). If the on-line field 512 (or 612) of the desired oCCR (or iCCR) is "1", since the oCCR (or iCCR) has already been used, the node which received the SET CCR control command returns the REJECTED response.

A fixed value "$F_{16}$", for example, is set in a field 809 (4 bits). A fixed value "$FF_{16}$", for example, is set in a field 810 (8 bits). A fixed value "$3F_{16}$", for example, is set in a field 811 (6 bits).

A field 812 (8 bits) becomes a payload size field when the oCCR is set and a receive buffer field when the iCCR is set. An amount of data which can be transferred by one data packet is set in the payload size field. Further, a data amount of one segment is set in the receive buffer field.

A field 813 (8 bits) is a field for designating upper 8 bits of the connection ID field shown in FIGS. 5A and 6B, and a field 814 (8 bits) is a field for designating lower 8 bits of the connection ID field. The controller 300 can set the desired connection ID in the desired oCCR (or iCCR) by using these two fields.

A field 815 (48 bits) is an offset address field for setting top address of the predetermined memory space reserved in the destination node 304. A field 816 (8 bits) is a CCR number field in which a number for designating the desired oCCR (or iCCR) among one or plural oCCRs (or iCCRs).

A field 817 (32 bits) is a data CRC field for storing error detecting codes for detecting errors in the fields 801 to 816.

Figure 9:
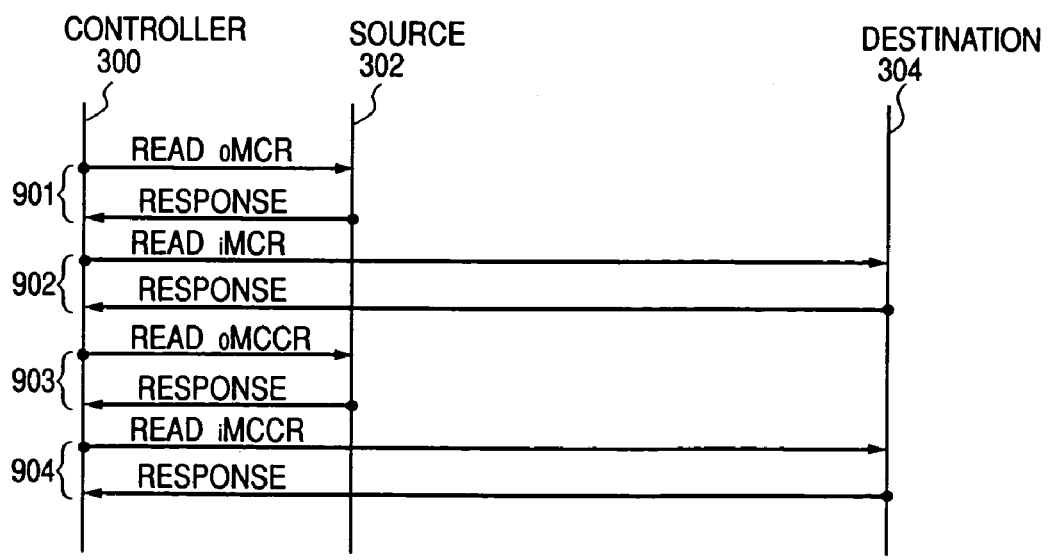
FIG. 9 is a sequence chart for explaining a procedure till a communication protocol used between the source node and the destination node is set.

Next, a procedure till the controller 300 sets the communication protocol used between the source node 302 and the destination node 304 will be described with reference to FIG. 9. In FIG. 9, the controller 300, source node 302 and destination node 304 effect negotiation (described hereinbelow) to set the communication protocol to be used.

First of all, the controller 300 sends the READ MCR status command packet shown in FIG. 7 to the source node 302 (901). The source node 302 returns the response packet in which the values of the fields 501 to 507 of the oMCR of the source node to the controller 300 (901).

Then, the controller 300 sends the READ MCR status command packet shown in FIG. 7 to the destination node 304 (902). The destination node 304 returns the response packet in which the values of the fields 601 to 607 of the iMCR of the destination node to the controller 300 (902).

By the above operation, the controller 300 which read out the oMCR of the source node 302 and the iMCR of the destination node 304 judges main communication ability of each node from the contents of each register and selects the available communication protocol.

For example, if the flow control flag 502 of the oMCR and the flow control flag 602 of the iMCR are both "1", the controller 300 judges that the source node 302 and the destination node 304 can correspond to the first communication protocol (i.e., protocol by which the broadcast data transferring is effected) which will be described later. In this case, the controller 300 selects the use of the first communication protocol.

After selection of the first communication protocol, the controller 300 produces the SET CCR control command shown in FIG. 8 in order to set the logical connection relationship between the source node 302 and the destination node 304.

In the SET CCR control command for setting the oCCR of the source node 302 (or the iCCR of the destination node 304), the controller 300 sets the value "1" in the broadcast flag field 807, the value "1" in the on-line field 808, the available connection IDs managed by the controller 300 in the connection ID fields 812, 813, the available destination offset of the destination node 304 in the offset address field 814, and the CCR number designating non-used oCCR (or iCCR) in the CCR number field 815, respectively.

Further, if either or both of the flow control flag 502 of the oMCR and the flow control flag 602 of the iMCR is "0", the controller 300 judges that the source node 302 and the destination node 304 cannot correspond to the first communication protocol (i.e., protocol by which the broadcast data transferring is effected) which will be described later. In this case, the controller 300 selects the use of the second communication protocol which will be described later.

After selection of the second communication protocol, the controller 300 produces the SET CCR control command shown in FIG. 8 in order to set the logical connection relationship between the source node 302 and the destination node 304.

In the SET CCR control command for setting the oCCR of the source node 302; the controller 300 sets the value "0" in the broadcast flag field 807, the value "1" in the on-line field 808, and the data amount which can be transferred by the single data packet in the payload size field 811, respectively.

Further, in the SET CCR control command for setting the iCCR of the destination node 304, the controller 300 sets the data amount of one segment in the receive buffer size field 811.

Further, in the SET CCR control command for setting the oCCR (or iCCR), the controller 300 sets the available destination offset of the destination node 304 in the offset address field 814 and sets the CCR number for designating the non-used oCCR (or iCCR) in the CCR number field 815.

In the illustrated embodiment, the value set in the receive buffer size field by the controller 300 is the integral multiple of the value set in the payload size field. With this arrangement, the data transferring efficiency can be improved.

Then, the controller 300 sends the above-mentioned SET CCR control command to the source node 302 in order to set the oCCR (903). The SET CCR control command includes the value indicating the communication protocol selected by the controller 300 and values required for the communication protocol. If the condition of the source node 302 can correspond to the SET CCR control command, the source node 302 returns the ACCEPTED response to the controller 300 (903). Thereafter, the source node 302 starts the data transferring on the basis of the selected communication protocol.

On the other hand, if the condition of the source node 302 cannot correspond to the SET CCR control command, the source node 302 returns the REJECTED response to the controller 300. In this case, the data transferring is not started, the logical connection is released, and the nodes start negotiation from initiation again.

Then, the controller 300 sends the above-mentioned SET CCR control command to the destination node 304 in order to set the iCCR (904). The SET CCR control command includes the value indicating the communication protocol selected by the controller 300 and values required for the communication protocol.

If the condition of the destination node 304 can correspond to the SET CCR control command, the destination node 304 returns the ACCEPTED response to the controller 300 (904). Thereafter, the destination node 304 starts the data transferring on the basis of the selected communication protocol.

On the other hand, if the condition of the destination node 304 cannot correspond to the SET CCR control command, the destination node 304 returns the REJECTED response to the controller 300. In this case, the data transferring is not started, the logical connection is released, and the nodes start negotiation from initiation again.

By the negotiation having the above-mentioned procedure, the controller 300 can set the connection between the source node 302 and the destination node 304, and the communication protocol used in the connection. Incidentally, in FIG. 9, while an example that one destination node 304 is used was explained, when there are a plurality of destination nodes, the above-mentioned processing may be performed for each destination node. In this case, the controller 300 selects the available communication protocol in accordance with the communication abilities of all of the nodes in question.

Next, the data transferring based upon the first communication protocol according to the illustrated embodiment will be described.

The first communication protocol serves to realize multi-cast communication by utilizing the broadcast communication.

In the first communication protocol, one object data is divided into one or more segments, and each segment is packetized to one or more "asynchronous broadcast packets", and each asynchronous broadcast packet is broadcast-transferred by "asynchronous broadcast transaction". Here, the asynchronous broadcast packet and the asynchronous broadcast transaction are new packet format and transfer method defined in the first communication protocol according to the illustrated embodiment.

Figure 10A:
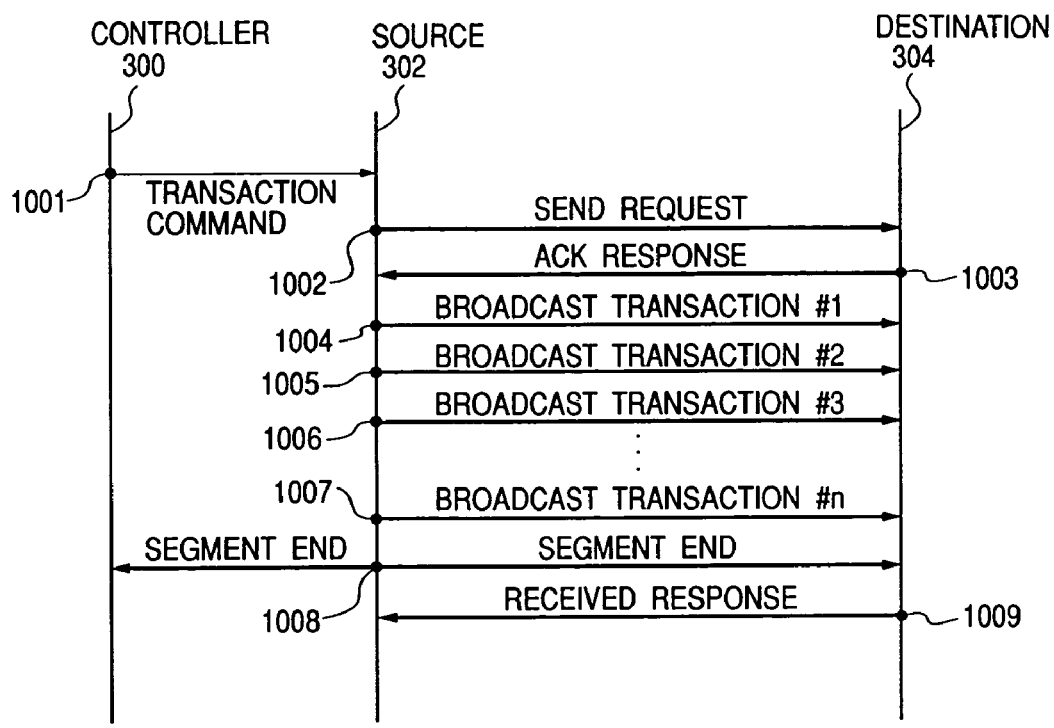
FIGS. 10A, 10B and 10C are sequence charts for explaining a first communication protocol according to a preferred embodiment of the present invention.

Now, the transferring procedure based upon the first communication protocol will be fully described with reference to FIGS. 10A and 10C. FIG. 10A is a sequence chart for explaining the transferring procedure or sequence between one source node and one destination node, and FIG. 10C is a sequence chart for explaining the transferring procedure or sequence between one source node and three destination node.

Figure 10B:
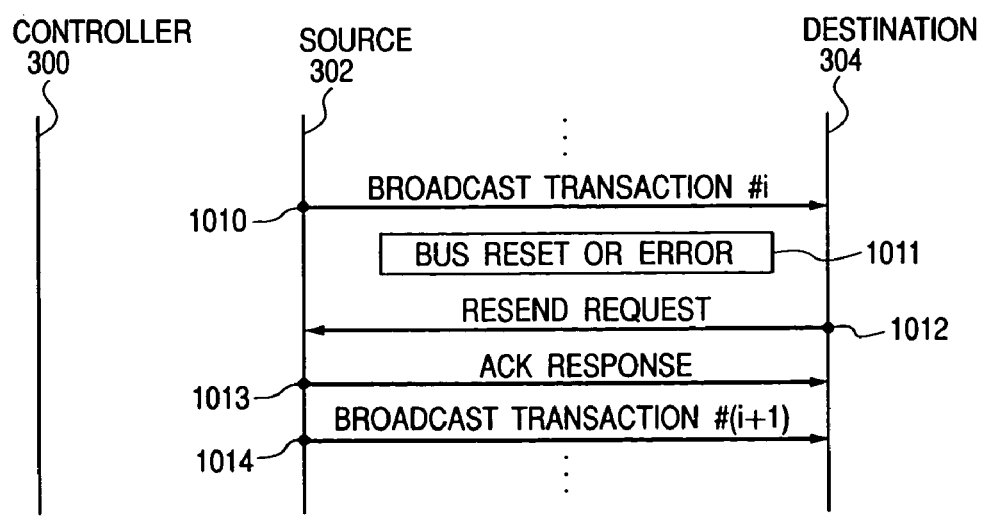
Figure 10C:
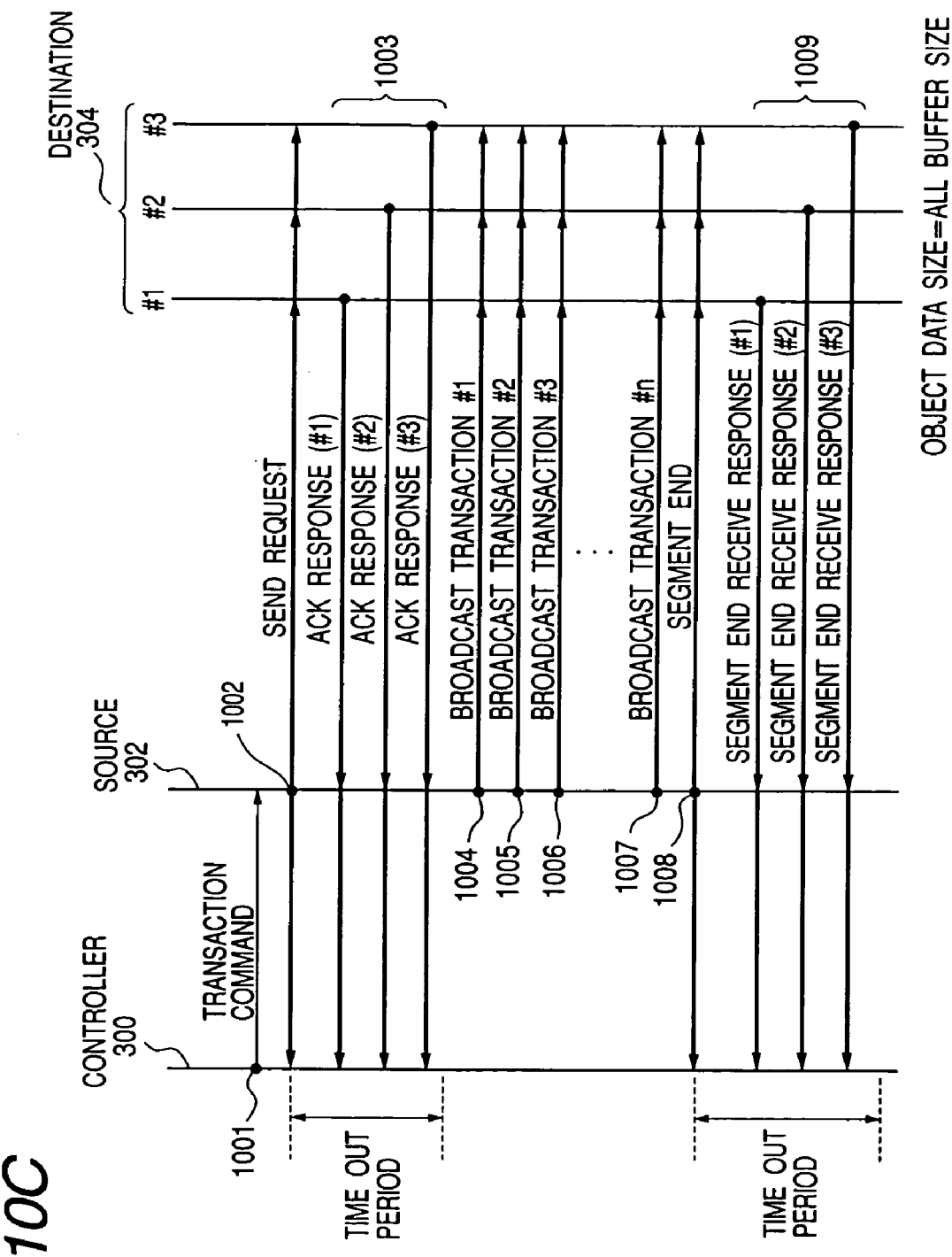

After the above-mentioned negotiation is finished, the controller 300 requests the source node 302 to start the transferring of the object data 308 (1001 in FIGS. 10A and 10C.).

After the request for initiation of the transferring is received, the source node 302 transfers the send request packet to one or more destination node 304 by the asynchronous broadcast transaction (1002 in FIGS. 10A and 10C). The connection ID set by the controller 300 is stored in the send request packet.

The destination node 304 which received the send request packet compares the connection ID of the send request packet with the connection ID set in the iCCR during the negotiation. If both coincide with each other, the destination node 304 receives the send request packet and transfers an ack response packet corresponding to this by the asynchronous broadcast transaction (1003 in FIGS. 10A and 10C). The sizes of the internal buffers which can be reserved in the destination nodes 304 are stored in the ack response packet.

After the ack response packet is received, the source node 302, executes the asynchronous broadcast transaction to successively broadcast one or more segments of the object data 308 (1004 to 1007 in FIGS. 10A and 10C).

Figure 11:
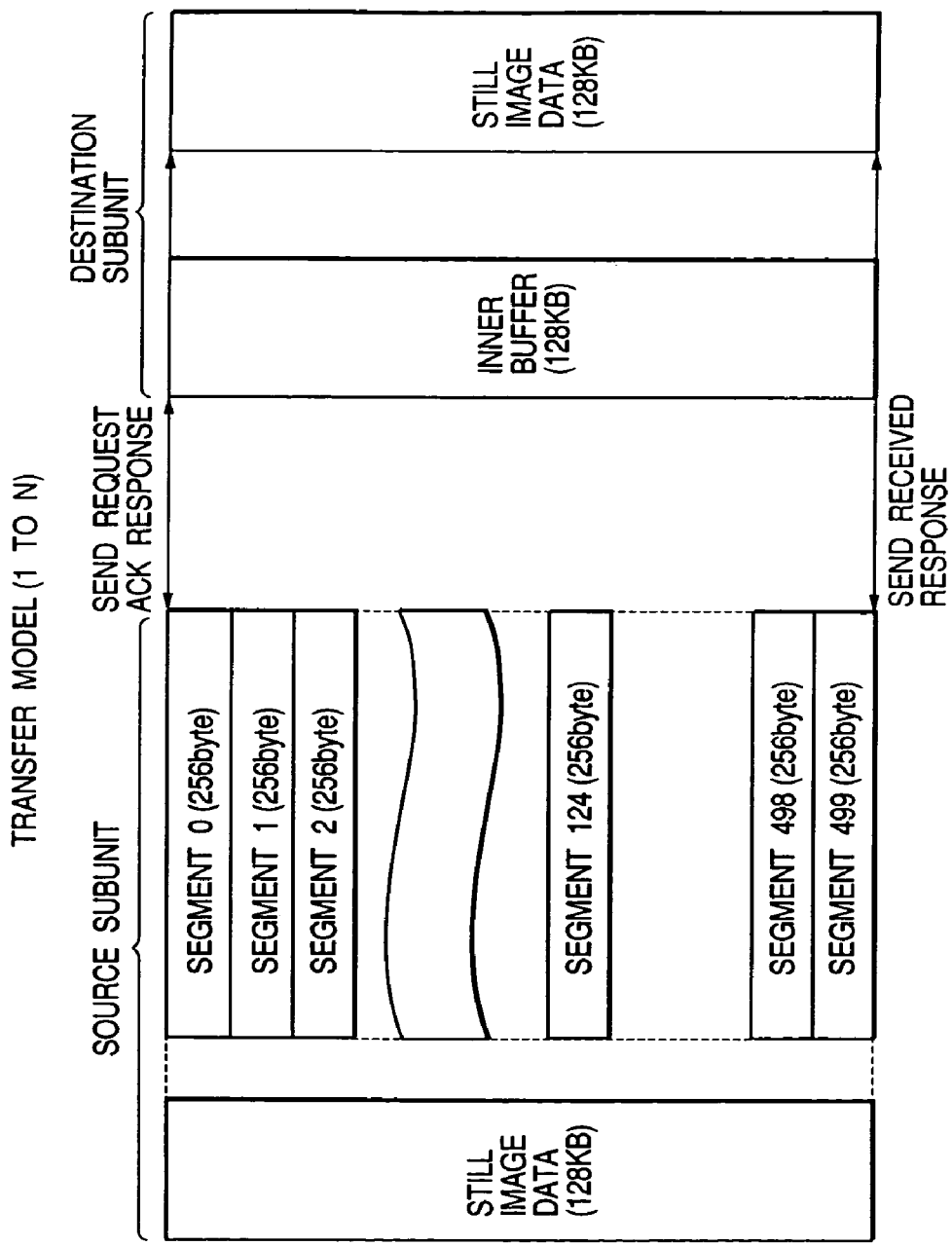
FIG. 11 is a view for explaining a procedure for transferring object data by the first communication protocol.

Now, an example of the transferring procedure for the object data 308 will be described. In FIG. 11, the object data 308 is, for example, still image data having a data size of 128 Kbytes.

The source node 302 divides the object data 308 into one or more segments in accordance with the receiving capacity of each destination node 304 recognized by using the send request packet. The data size of one segment is variably set by the source node 302 on the basis of the size of the internal buffer of each destination node 304. For example, as shown in FIG. 11, if the internal buffer having the same size as that of the object data 308 can be reserved in each destination node 304, the source node 302 divides the object data 308 into one segment.

Then, the source node 302 divides each segment into one or more segment data. FIG. 11 shows an example that one segment is divided into 500 segment data (one segment data=256 bytes).

The source node 302 successively broadcasts the segments by using at least one asynchronous broadcast transaction. FIG. 11 shows an example that one segment data is transferred by using one asynchronous broadcast transaction.

After all of the segment data of one segment are transferred, if there is next segment, the source node 302 prepares for transferring of the next segment; whereas, if there is next segment, the communication to the destination node 304 is terminated (1008, 1009 in FIGS. 10A and 10C).

Next, an operation of the controller 300 will be fully described with reference to FIGS. 10A and 10C.

The controller 300 transfers a transaction command packet to the source node 302 in an asynchronous manner (1001 in FIGS. 10A and 10C).

The source node 302 which received the transaction command packet effects the initial setting by using the connection ID notified from the controller 300 (1002, 1003 in FIGS. 10A and 10C) and executes the asynchronous broadcast transaction (1004 to 1007 in FIGS. 10A and 10C). By this asynchronous broadcast transaction, the source node 302 can transfer one or more segments of the object data 308 successively.

Incidentally, in the first communication protocol according to the illustrated embodiment, the controller 300 provides a function for controlling setting/releasing of the connection. Accordingly, the transferring of the object data 308 after the setting of the connection is carried out by the negotiation between the source node 302 and the destination node 304.

After a series of asynchronous broadcast transactions are finished, the source node 302 broadcasts an asynchronous broadcast packet indicating segment end (referred to as "segment end packet" hereinafter) (1008 in FIGS. 10A and 10C).

After the segment end packet is received from the source node 302, the controller 300 releases the connection to terminate the data transferring.

Since the segment end packet is broadcasted, the contents of this packet can be detected also in the destination node 304. Accordingly, in place of the controller 300, the destination node 304 can be constituted to release the connection to the source node 302 by the destination node itself.

Next, an operation of the source node 302 will be fully described with reference to FIGS. 10A and 10C.

The source node 302 which received the transaction command packet from the controller 300 sends the above-mentioned send request packet to each destination node 304 (1002 in FIGS. 10A and 10C).

The send request packet is a packet for obtaining required initial information before the asynchronous broadcast transaction for the object data 308 is started. The connection ID designated by the controller 300 is written in this packet.

The destination node 304 broadcasts the ack response packet which is response to the send request packet (1003 in FIGS. 10A and 10C). The same connection ID as that of the send request packet is stored in the ack response packet. Accordingly, the source node 302 can discriminate which kind of connection by which the ack response packet is transferred, by ascertaining the connection ID of the receiving packet.

The sizes of the internal buffers reserved in the destination nodes 304 are stored in the ack response packet. After the ack response packet is received, the source node 302 starts the asynchronous broadcast transaction by using the destination offset commonly designating the memory spaces of the destination nodes 304. The destination offset is address designated by the controller 300 during the negotiation.

Then, the source node 302 writes the asynchronous broadcast packet in the memory space indicated by the destination offset (1004 in FIGS. 10A and 10C). The connection ID and the sequence number of the segment data are stored in this packet.

After the first asynchronous broadcast packet is sent, the source node 302 is waiting for the response from the destination node 304. The response packet storing the connection ID and the sequence number is sent from the destination node 304 as a form of the asynchronous broadcast packet. After the response packet is received, the source node 302 effects increment of the sequence number and transfer the asynchronous broadcast packet including the next segment data (1005 in FIGS. 10A and 10C).

By repeating such procedure, the source node 302 executes the asynchronous broadcast transactions successively (1006, 1007 in FIGS. 10A and 10C). A maximum time period for waiting for the response from the destination node 304 is previously determined, and, if the response is not received after the maximum time period is elapsed, the same data is sent again by using the same sequence number.

Further, when a response packet requesting the re-sending is transferred from the destination node 304, the source node 302 can broadcast the data having the designated sequence number.

After all of the segments of the object data 308 were transferred by using the asynchronous broadcast transactions, the source node 302 broadcasts the segment end packet to terminate the data transferring (1008 in FIGS. 10A and 10C).

Incidentally, in the above-mentioned embodiment, while an example that the response packet is sent without fail in the asynchronous broadcast transaction of one segment data was explained, the present invention is not limited to such an example. After the data buffer of the destination node 304 is filled with a plurality of continuous segment data, the destination node 304 may send the response packet.

Next, an operation of the destination node 304 will be fully described with reference to FIGS. 10A and 10C.

After the above-mentioned negotiation, the destination node 304 is waiting for the send request packet from the source node 302 (1002 in FIGS. 10A and 10C).

The destination node 304 which received the send request packet ascertains or confirms the destination ID written in that packet and the connection ID notified from the controller and discriminates whether the packet is sent from the source node 302 or not.

After the send request packet from the source node 302 is received, each destination node 304 broadcasts the ack response packet in which the connection ID and the reservable internal buffer size (1003 in FIGS. 10A and 10C).

After the asynchronous broadcast packet transferred from the source node 302 is written in the memory space, the destination node 304 confirms the connection ID of that packet. If the connection ID included in that packet coincides with the connection ID of the destination node, the response packet in which the connection ID and the sequence number included in that packet are stored is broadcasted (1004 to 1007 in FIGS. 10A and 10C). In this case, the segment data included in the receiving packet is stored in the internal buffer. If the connection ID included in the receiving packet differs from the connection ID of the destination node, the destination node 304 discards such receiving packet.

Further, if difference in the sequence number of the receiving packet is detected, the destination node 304 can send a response packet indication re-send request. In this case, the destination node 304 informs the source node 302 of the sequence number for the re-send request.

After all of the asynchronous broadcast transactions are finished, the segment end packet is sent from the source node 302. When this packet is received, the destination node 304 terminates the data transferring process (1008 in FIGS. 10A and 10C).

After the segment end packet is received, the destination node 304 broadcasts a response packet indicating the fact that the segment end packet is properly received (1009 in FIGS. 10A and 10C).

As mentioned above, the communication system according to the illustrated embodiment can eliminate inconvenience of the conventional communication systems. Further, in the data transferring not requiring the real time feature, the data can easily be transferred at a high speed.

Further, in the illustrated embodiment, after the connection is set by the controller 300, the transfer processing of the object data is executed between the source node 302 and each destination node 304 without control of the controller 300. As a result, a simple communication protocol in which the load of the controller 300 is reduced and complicated communication procedure is not required can be provided.

Furthermore, in the illustrated embodiment, the destination node 304 is designed to return the response to each asynchronous broadcast transaction. With this arrangement, a communication protocol capable of positively transferring the data not requiring the real time ability can be provided.

In order to realize more positive data transferring, if the data transferring is interrupted due to bus reset or any transfer error, it is necessary that the data transferring is quickly re-started without losing any data. Now, a re-starting procedure defined by the communication protocol according to the illustrated embodiment will be described with reference to FIG. 10B.

For example, if the bus reset occurs after the asynchronous broadcast packet having the sequence number i was received, each node interrupts the transferring process and executes initialization of the bus, confirmation of the connection relationship and setting of the node ID, in accordance with the procedures defined in the IEEE 1394-1995 Standard (1010, 1011 in FIG. 10B).

After re-construction of the bus is completed, each destination node 304 broadcasts a resend request packet in which the connection ID and the sequence number i are stored (1012 in FIG. 10B).

If the asynchronous broadcast transaction can be re-started, the source node 302 confirms the connection ID of the received resend request packet and broadcasts the ack response packet in which the connection ID is stored (1013 in FIG. 10B).

Thereafter, the source node 302 broadcasts the segment data having sequence numbers next to the sequence number requested by the resend request packet, i.e., segment data starting from the sequence number (i+1) successively (1014 in FIG. 10B).

By the above-mentioned procedure, the controller 300, source node 302 and destination node 304 can re-start the data transferring easily and positively without considering their node IDs, even if the data transferring is interrupted.

Further, as mentioned above, in the illustrated embodiment, even if the data transferring is interrupted, a control procedure of the controller 300 can be simplified.

Next, a construction of the asynchronous broadcast packet used in the first communication protocol will be explained with reference to FIG. 12A. The asynchronous broadcast packet is a data packet having unit of 1 Quadlet (4 bytes=32 bits), for example.

First of all, an arrangement of a packet header 1219 will be described.

In FIG. 12A, a field 1201 (16 bits) indicates the destination ID and node ID of the recipient (i.e., destination node 304). In the communication protocol according to the illustrated embodiment, in order to realize the asynchronous broadcast transaction of the object data 308, a value of this field is selected for broadcast ID (i.e., "$FFFF_{16}$").

A field 1202 (6 bits) is a transaction level (tl) field which is a tag inherent to the transaction.

A field 1203 (2 bits) is a retry (rt) code field for designating whether the packet effects retry or not.

A field 1204 (4 bits) indicates a transaction code (tcode). The tcode designates format of the packet and type of transaction to be executed. In the illustrated embodiment, a value of this field is selected to "$0001_2$", for example, and a process (i.e., write transaction) for writing a data block 522 of this packet in the memory field of a destination offset field 1207 is requested.

A field 1205 (4 bits) is a priority (pri) field, and, in the illustrated embodiment, a value of this field is selected to "$0000_2$".

A field 1206 (16 bits) is a source ID field for indicating node ID of the sender (i.e., source node 302).

A field 1207 (48 bits) is the destination offset field for commonly designating lower 48 bits of the address spaces of the destination nodes 304.

A field 1208 (16 bits) is a data length field indicating a length of a data field (described later) in byte unit.

A field 1209 (16 bits) is an extended tcode field. In the illustrated embodiment, a value of this field is selected to "$0000_2$".

A field 1210 (32 bits) is a header CRC field in which error detecting codes for detecting error in the fields 1201 to 1209.

Next, a construction of a data block 1220 will be described. The data block 1220 includes header (packet) information 1221 and a data field 1222.

Connection ID for discriminating logic connection relationships (connections) between the nodes is stored in the header information 1221. Incidentally, a construction of the header information 1221 is varied in accordance with purpose of usage.

The data field 1222 is a field having variable length in which the segment data are stored. If the number of the segment data stored in the data field is not multiple of Quadlet, "0" is added until the Quadlet is reached.

A field 1211 (16 bits) is a connection ID field in which the connection ID according to the illustrated embodiment is stored. The 1394 interface according to the illustrated embodiment discriminates the connections set between the source node 302 and one or more destination nodes 304 on the basis of the connection ID stored in this field. In the illustrated embodiment, $2^{16}$×(node number) connections can be established. Thus, a plurality of connections can be set until a total amount of communication bands used in each connection reach the capacity of the transfer path.

A field 1212 (8 bits) is a protocol type field indicating a communication procedure (i.e., kind of communication protocol) based upon the header information 1221. When indicating the communication protocol according to the illustrated embodiment, a value of this field becomes "$01_{16}$", for example.

A field 1213 (8 bits) shows control flags, in which predetermined control data for controlling a communication procedure of the communication protocol according to the illustrated embodiment and the like are set. In the illustrated embodiment, an uppermost bit of this field is selected to a resend request flag, for example. Accordingly, when a value of the uppermost bit of this field becomes "1", it is indicated that resend request based upon the communication protocol according to the illustrated embodiment occurs.

A field 1214 (16 bits) is a sequence number field in which continuous values (i.e., sequence numbers) are set regarding the packets transferred on the basis of the particular connection ID (i.e., connection ID designated in the field 511). By using such sequence numbers, the destination node 304 can monitor continuity of the segment data transferred successively by the asynchronous broadcast transaction. If there is no coincidence, the destination node 304 can effect resend request on the basis of the sequence number.

A field 1215 (16 bits) is a reconfirmation number field. In the illustrated embodiment, this field is used only if the value of the resend request flag is "1". For example, if the value of the resend request flag is "1", the sequence number of the resend request packet is set in this field.

A field 1216 (16 bits) is a buffer size field. The buffer size of the destination node 304 is set in this field.

A field 1217 (16 bits) is a reserved field which is prepared for the future.

A field 1218 (32 bits) is a data CRC field in which error detecting codes for detecting errors in the fields 1211 to 1217 are stored, as is in the header CRC field.

Figure 12B:
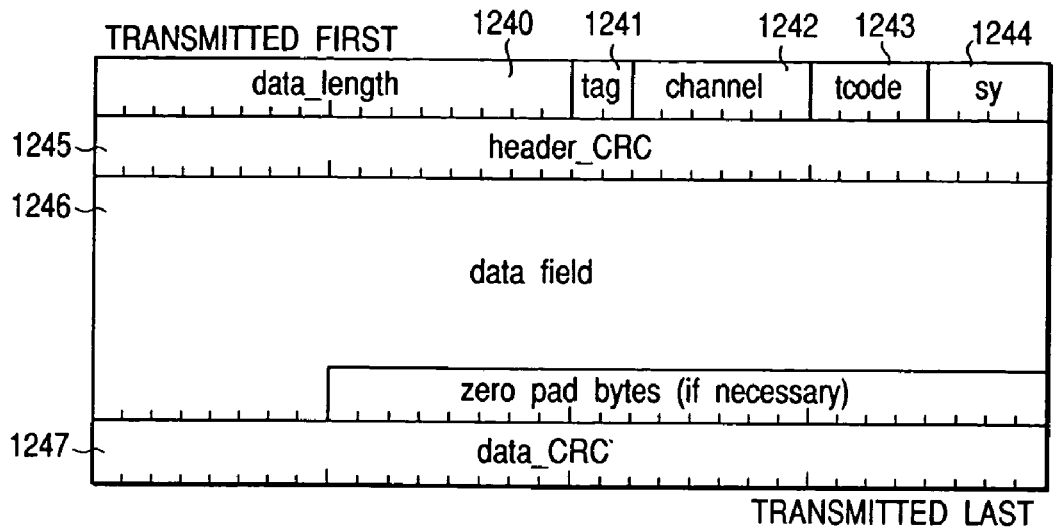

Incidentally, in the first communication protocol according to the illustrated embodiment, while an example that the asynchronous broadcast transaction is realized by using the asynchronous broadcast packet shown in FIG. 12A was explained. The present invention is not limited to such an example. For example, the asynchronous broadcast transaction can be realized by using an asynchronous stream packet shown in FIG. 12B. In this case, the object data is divided into one or more segments, and each segment is packetized to one or more asynchronous stream packets. The source node 302 broadcast-transferring the asynchronous stream packets successively within an asynchronous transferring period. A format and a transferring method for the asynchronous stream packet are defined in IEEE 1394 a Standard which is an extended Standard of the IEEE 1394-1995 Standard.

In FIG. 12B, a field 1240 (16 bits) is a data length field. A length of a data field 1246 (described later) is stored as byte unit in this field. A field 1241 (2 bits) is a tag field in which a value "$00_2$" is stored.

A field 1242 (6 bits) is a channel field. A channel number assigned to a series of the asynchronous stream packets including its packet are set in this field. A field 1243 (4 bits) is a transaction code (tcode) field for designating a value "$A_{16}$" indicating the asynchronous stream packet.

A field 1244 (4 bits) is an asynchronous code (sy) field. Control code determined in dependence upon the application used is stored in this field. A field 1245 (32 bits) is a header CRC field in which error detecting codes for detecting errors in the fields 1241 to 1244 are stored.

A field (variable length) 1246 is a data field in which values of the fields 1211 to 1217 shown in FIG. 12A and the segment data are stored. If the segment data stored in the field 1246 is not the multiple of Quadlet, "0" is added until the Quadlet is reached. A field 1247 (32 bits) is a data CRC field. Similar to the header CRC field, an error detecting code for detecting an error in the field 1246 is this field.

Next, the second communication protocol according to the illustrated embodiment will be described.

The second communication protocol is a communication protocol utilizing a communication system in which the recipient is identified and realizing unicast communication.

In the second communication protocol, one object data is divided into one or more segments, and each segment is packetized to "asynchronous write request packets" and is transferred by "asynchronous write transaction". The asynchronous write request packet and the asynchronous write transaction are a packet format and a transfer method defined in the IEEE 1394-1995 Standard.

Figure 13:
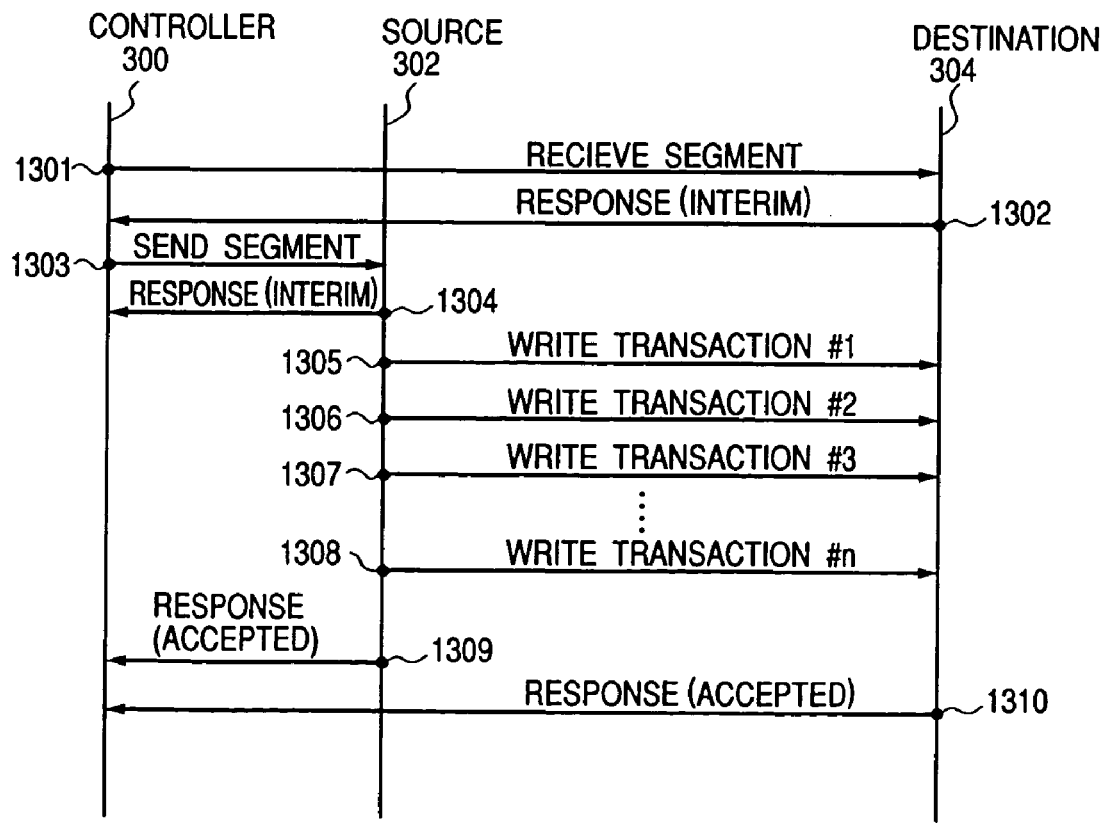
FIG. 13 is a sequence chart for explaining a second communication protocol according to a preferred embodiment of the present invention.

Now, a transferring procedure based upon the second communication protocol will be fully described with reference to FIG. 13.

After the above-mentioned negotiation (FIG. 9) is finished, first of all, the controller 300 sends receive segment command to the destination node 304 (1301). As soon as a receiving condition is prepared, the destination node 304 sends INTERIM response to the controller 300 and assumes a waiting condition (1302).

Then, the controller 300 sends send segment command to the source node 302 (1303). The source node 302 sends INTERIM response to the controller 300 and assumes a data receiving condition (1304).

After the data receiving condition is established, the source node 302 sends the desired object data 308 to the destination node 304 by using the asynchronous write transaction (1305-1308).

Now, an example of a transferring procedure for transferring the object data 308 will be explained. In FIG. 11, the object data 308 is still image data having data size of 128 Kbytes.

The source node 302 divides the object data 308 into one or more segments. For example, if the internal buffer having the same size as that of the object data 308 could be reserved in the destination node 304, the source node 302 divides the object data into one segment.

Then, the source node 302 detects the contents of the payload size field 514 of the oCCR designated by the controller 300 and divides each segment into one or more segment data. FIG. 11 shows an example that the object data 308 of one segment is divided into 500 segment data (one segment=256 bytes). The contents of the payload size field 514 is set by the controller 300.

Then, the source node 302 transfers the segments successively by using one asynchronous write transaction. FIG. 11 shows an example that one segment data is transferred by using one asynchronous write transaction.

When a total amount of data successively transferred by one or more asynchronous write transaction reaches the value set in the receive buffer size field 614 (i.e., capacity of the internal buffer), the source node 302 sends ACCEPTED response to the send segment command to the controller 300 (1309).

Then, the destination node 304 sends ACCEPTED response to the receive segment command to the controller 300 and informs of the fact that the data transferring of one segment is completed (1310). If there is a next segment, the controller 300, source node 302 and destination node 304 repeat the aforementioned procedures.

In this way, the source node 302 can positively send the desired object data 308 to the destination node 304 by using the asynchronous write transaction.

As mentioned above, in the above-mentioned embodiments, the logical connection relationship which does not rely upon the physical connection style can be established in the bus-type network such as defined by the IEEE 1394-1995 Standard.

Further, according to the illustrated embodiment, in communication systems based upon the IEEE 1394-1995 Standard, there can be provided a new communication protocol in which object data having a relatively large amount of data and not requiring real time ability but requiring high reliability (for example, still image data, graphic data, text data, file data, program data or the like) is divided into one or more segments and the segments are successively transferred by using the asynchronous transferring.

Further, according to the illustrated embodiment, in communication systems based upon the IEEE 1394-1995 Standard, there can be provided a new communication protocol in which data communication between plural equipments is realized by using broadcast communication of asynchronous transfer type.

In addition, according to the illustrated embodiment, in communication systems based upon the IEEE 1394-1995 Standard, even if there are a plurality of different communication protocols, the available communication protocol can automatically be discriminated and be used properly.

Other Embodiments

The communication protocols explained in the aforementioned embodiments and various processing operations required for realizing the such communication protocols can also be realized by software.

For example, a recording medium storing program code for realizing the function of each embodiment may be supplied to the control portion (for example, MPU 12, system controller 50, printer controller 68 in FIG. 1) of the equipment constituting the communication system according to each embodiment so that the control portion reads out the program code stored in the recording medium and controls the operation of the communication system or the equipment itself to execute the function of each embodiment in accordance with the program code.

Alternatively, a recording medium storing program code for realizing the function of each embodiment may be supplied to the 1394 interface 14, 44 or 62 of each equipment so that the control portion (for example, serial bus management 206 in FIG. 2) for controlling the operation of the 1394 interface 14, 44 or 62 controls the processing operations to execute the function of each embodiment in accordance with the program code.

In this case, the program code itself read out from the recording medium realizes the function of each embodiment, and the program code itself and a means (for example, the recording medium itself) for supplying the program code to the control portion form a part of the present invention.

Such a recording medium storing the program code may, for example, a floppy disc, a hard disc, an optical disc, a photo-magnetic disc, CD-ROM, a magnetic tape, a non-volatile memory card, ROM or the like.

It should be noted that a case where the program code read out from the recording medium cooperates with OS (operating system) or one of various application software operating on the control portion to realize the function of each embodiment is also included in the present invention.

Further, it should be noted that a case where, after the program code read out from the recording medium is stored in a memory of a function expanding unit connected to the control portion, a control portion of the function expanding unit executes part or all of the actual processing in accordance with the program code stored in the memory to realize the function of each embodiment is also included in the present invention.

The invention may be embodied in other specific forms without departing from the spirits or essential characteristics thereof.

For example, in the illustrated embodiments, while an example that, when the controller 300 reads out the oMCR of the source node 302 and the iMCR of the destination node 304, the controller sends the READ MCR status command shown in FIG. 7 to the nodes was explained, the present invention is not limited to such an example. So long as the addresses of the oMCR and the iMCR may previously be constructed to become specific addresses, the controller 300 can read out the contents of the registers by using the asynchronous read transaction defined in the IEEE 1394-1995 Standard.

In such a case, the 1394 interface according to the illustrated embodiment can realize a part of the processing of the negotiation shown in FIG. 9 without affecting an influence upon the layers more upper than the transaction layer shown in FIG. 2. Thus, the 1394 interface according to the illustrated embodiment can reduce the load on the application layers and facilitates hardware specification.

Further, in the illustrated embodiments, while an example that, when the controller 300 writes the predetermined values in the oCCR of the source node 302 and the iCCR of the destination node 304, the controller sends the SET CCR control command shown in FIG. 8 to the nodes was explained, the present invention is not limited to such an example. So long as the addresses of the oCCR and the iCCR may previously be constructed to become specific addresses, the controller 300 can write the contents of the registers by using asynchronous read write compare swap lock transaction defined in the IEEE 1394-1995 Standard.

In such a case, the 1394 interface according to the illustrated embodiment can realize a part of the processing of the negotiation shown in FIG. 9 by response to the lock transaction. Thus, since the 1394 interface according to the illustrated embodiment can realize the above-mentioned processing by the response in the transaction layer, the processing speed can be more improved. Further, the load on the application layers can be reduced and hardware specification can be facilitated.

In the illustrated embodiments, while the construction and procedure of the controller 300 capable of selecting two different communication protocols was explained, the controller can select the communication protocol among three or more communication protocols. In this case, each node can indicate a support condition of each communication protocol by the reserved field 503 of the oMCR or the reserved field 506 of the iMCR.

Further, in the illustrated embodiments, while the communication protocols applicable to the network based upon the IEEE 1394-1995 Standard was explained, the present invention is not limited to such protocols. The communication protocols according to the present invention can be applied to the bus-type network based upon the IEEE 1394-1995 Standard or a network capable of imaginarily constructing such a bus-type network.

Therefore, the above-mentioned embodiments are merely examples in all respects, and must not be construed to limit the invention.

The scope of the present invention is defined by the scope of the appended claims, and is not limited at all by the specific descriptions of this application. Furthermore, all the modifications and changes belonging to equivalents of the claims are considered to fall within the scope of the present invention.

What is claimed is:

1. A communication system controlling a logical connection comprising:

a controller;

a source node including a first connection control register; and a destination node including a second connection control register, wherein said controller is adapted to select one of a first and a second communication protocol as a communication protocol to be used between said source node and said destination node, to set a logical connection to be used between said source node and said destination node, to access the first connection control register to store therein information for the communication protocol selected by the controller and information for the logical connection set by said controller, and to access the second connection control register to store therein information for the communication protocol selected by said controller and information for the logical connection set by said controller, wherein the first communication protocol is a communication protocol that uses a broadcast communication, but does not use an isochronous transfer, and wherein said controller, said source node and said destination node are adapted to communicate with each other using a communication unit conformed to IEEE 1394-1995 standard.

2. A method for a communication system that includes a controller, a source node including a first connection control register, and a destination node including a second connection control register, said method comprising the steps of:

selecting one of a first and a second communication protocol as a communication protocol to be used between the source node and the destination node in the controller;

setting a logical connection to be used between the source node and the destination node in the controller;

accessing the first connection control register to store therein information for the communication protocol selected by the controller and information for the logical connection set by the controller; and accessing the second connection control register to store therein information for the communication protocol selected by the controller and information for the logical connection set by the controller, wherein the first communication protocol is a communication protocol that uses a broadcast communication, but does not use an isochronous transfer, and wherein the controller, the source node and the destination node are adapted to communicate with each other using a communication unit conformed to IEEE 1394-1995 standard.

3. A controller comprising:

a controlling unit adapted to select one of a first and a second communication protocol as a communication protocol to be used between a source node including a first connection control register and a destination node including a second connection control register, to set a logical connection to be used between the source node and the destination node, to access the first connection control register to store therein information for the selected communication protocol and information for the set logical connection, and to access the second connection control register to store therein information for the selected communication protocol and information for the set logical connection, wherein the first communication protocol is a communication protocol that uses a broadcast communication, but does not use an isochronous transfer, and wherein the source node and the destination node are adapted to communicate with each other using a communication unit conformed to IEEE 1394-1995 standard.

4. A method for a controller, the method comprising the steps of:

selecting one of a first and a second communication protocol as a communication protocol to be used between a source node including a first connection control register and a destination node including a second connection control register in the controller;

setting a logical connection to be used between the source node and the destination node in the controller;

accessing the first connection control register to store therein information for the communication protocol selected by the controller and information for the logical connection set by the controller; and accessing the second connection control register to store therein information for the communication protocol selected by the controller and information for the logical connection set by the controller, wherein the first communication protocol is a communication protocol that uses a broadcast communication, but does not use an isochronous transfer, and wherein the source node and the destination node are adapted to communicate with each other using a communication unit conformed to IEEE 1394-1995 standard.

5. A communication system comprising:

a source node including a first connection control register;

a destination node including a second connection control register; and a controller, wherein said controller is adapted to select one of a first and a second communication protocol as a communication protocol to be used between said source node and said destination node, to set a logical connection to be used between said source node and said destination node, to access the first connection control register to store therein information for the communication protocol selected by said controller and information for the logical connection set by said controller, and to access the second connection control register to store therein information for the communication protocol selected by said controller and information for the logical connection set by said controller, wherein said controller, said source node and said destination node are adapted to communicate with each other using a communication unit conformed to IEEE 1394-1995 standard, and wherein said first communication protocol is a communication protocol that uses an asynchronous transfer, but does not use an isochronous transfer.

6. A communication system according to claim 5, wherein the second communication protocol is a communication protocol that does not use a broadcast communication.

7. A communication system according to claim 6, wherein the first communication protocol is a communication protocol that uses a broadcast communication.

8. A method for a communication system that includes a source node including a first connection control register, a destination node including a second connection control register and a controller, said method comprising the steps of:
- selecting one of a first and a second communication protocol as a communication protocol to be used between the source node and the destination node in the controller;
- setting a logical connection to be used between the source node and the destination node in the controller;
- accessing the first connection control register to store therein information for the communication protocol selected by the controller and information for the logical connection set by the controller; and
- accessing the second connection control register to store therein information for the communication protocol selected by the controller and information for the logical connection set by the controller,
- wherein the controller, the source node and the destination node are adapted to communicate with each other using a communication unit conformed to IEEE 1394-1995 standard, and
- wherein said first communication protocol is a communication protocol that uses an asynchronous transfer, but does not use an isochronous transfer.

9. A method according to claim 8, wherein the second communication protocol is a communication protocol that does not use a broadcast communication.

10. A method according to claim 9, wherein the first communication protocol is a communication protocol that uses a broadcast communication.

11. A controller comprising:
- a controlling unit adapted to select one of a first and a second communication protocol as a communication protocol to be used between a source node including a first connection control register and a destination node including a second connection control register, to set a logical connection to be used between the source node and the destination node, to access the first connection control register to store therein information for the selected communication protocol and information for the set logical connection, and to access the second connection control register to store therein information for the selected communication protocol and information for the set logical connection,
- wherein the source node and the destination node are adapted to communicate with each other using a communication unit conformed to IEEE 1394-1995 standard, and
- wherein said first communication protocol is a communication protocol that uses an asynchronous transfer, but does not use an isochronous transfer.

12. A controller according to claim 11, wherein the second communication protocol is a communication protocol that does not use a broadcast communication.

13. A controller according to claim 12, wherein the first communication protocol is a communication protocol that uses a broadcast communication.

14. A method for a controller, said method comprising the steps of:
- selecting one of a first and a second communication protocol as a communication protocol to be used between a source node including a first connection control register and a destination node including a second connection control register in the controller;
- setting a logical connection to be used between the source node and the destination node in the controller;
- accessing the first connection control register to store therein information for the communication protocol selected by the controller and information for the logical connection set by the controller; and
- accessing the second connection control register to store therein information for the communication protocol selected by the controller and information for the logical connection set by the controller,
- wherein the source node and the destination node are adapted to communicate with each other using a communication unit conformed to IEEE 1394-1995 standard, and
- wherein said first communication protocol is a communication protocol that uses an asynchronous transfer, but does not use an isochronous transfer.

15. A method according to claim 14, wherein the second communication protocol is a communication protocol that does not use a broadcast communication.

16. A method according to claim 15, wherein the first communication protocol is a communication protocol that uses a broadcast communication.

* * * * *

UNITED STATES PATENT AND TRADEMARK OFFICE
CERTIFICATE OF CORRECTION

PATENT NO. : 7,123,621 B1
APPLICATION NO. : 09/288038
DATED : October 17, 2006
INVENTOR(S) : Mitsuo Niida et al.

It is certified that error appears in the above-identified patent and that said Letters Patent is hereby corrected as shown below:

<u>COLUMN 1</u>:

Line 30, "interconnected" should read --be interconnected--.

<u>COLUMN 2</u>:

Line 58, "system." should read --apparatus.--.

<u>COLUMN 4</u>:

Line 24, "an" should be deleted; and
    Line 27, "an" should be deleted.

<u>COLUMN 9</u>:

Line 23, "mode" should read --more--; and
    Line 44, "node 304." should read --nodes 304.--.

<u>COLUMN 12</u>:

Line 29, " "$0001_2$" " should read -- "$0001_2$", --; and
    Line 45, " "$0000_2$" A" should read -- "$0000_2$". A-- and "a" should read --is a--.

<u>COLUMN 16</u>:

Line 28, "node." should read --nodes.--; and
    Line 36, "node 304" should read --nodes 304--.

<u>COLUMN 18</u>:

Line 18, "transfer" should read --transfers--.

<u>COLUMN 21</u>:

Line 43, "packets. The" should read --packets, the--; and
    Line 47, "IEEE 1394 a Standard" should read --IEEE 1394.a Standard--.

<u>COLUMN 22</u>:

Line 54, "transaction" should read --transactions--.

UNITED STATES PATENT AND TRADEMARK OFFICE
CERTIFICATE OF CORRECTION

PATENT NO. : 7,123,621 B1
APPLICATION NO. : 09/288038
DATED : October 17, 2006
INVENTOR(S) : Mitsuo Niida et al.

It is certified that error appears in the above-identified patent and that said Letters Patent is hereby corrected as shown below:

<u>COLUMN 23</u>:

Line 31, "the" should be deleted; and
    Line 55, "may," should read --may be,--.

Signed and Sealed this

Twenty-sixth Day of June, 2007

JON W. DUDAS
*Director of the United States Patent and Trademark Office*